April 14, 1964   G. F. RITTER, JR   3,129,088
BENT GLASS SHEET HANDLING
Filed Oct. 30, 1961   15 Sheets-Sheet 1

INVENTOR.
George F. Ritter, Jr.
BY
Nobbe & Swope
ATTORNEYS

INVENTOR.
George F. Ritter, Jr.
BY Nobbe & Swope
ATTORNEYS

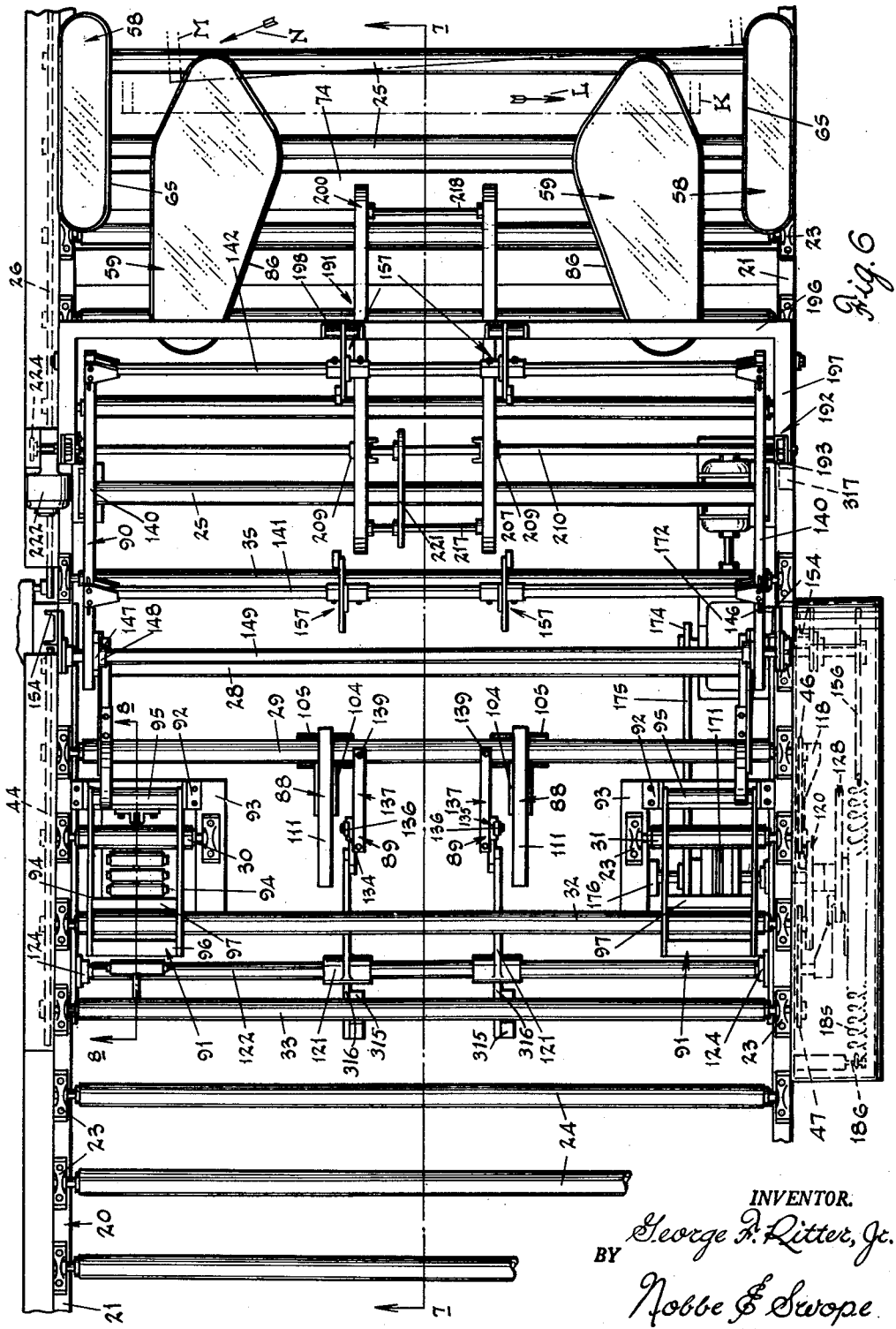

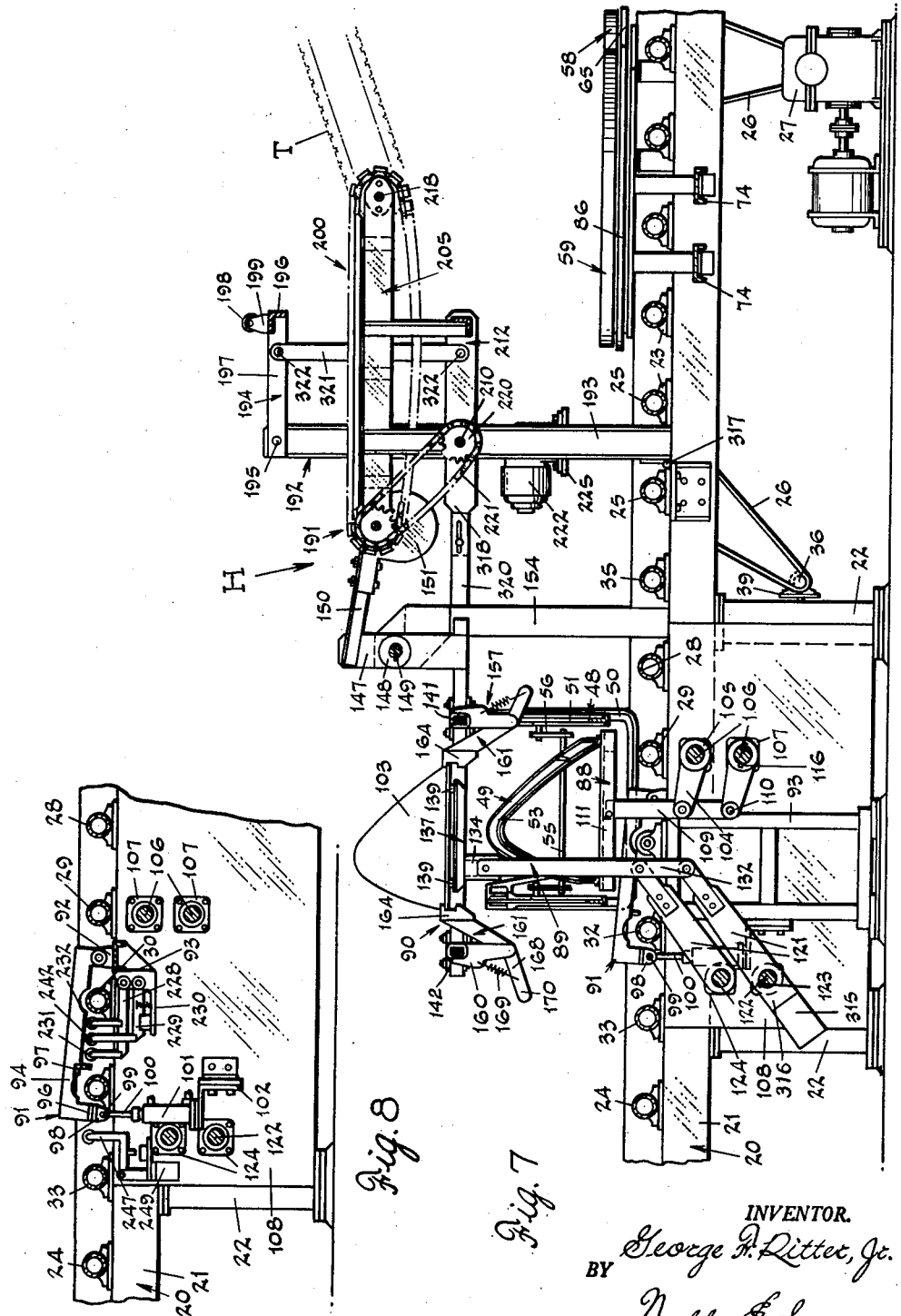

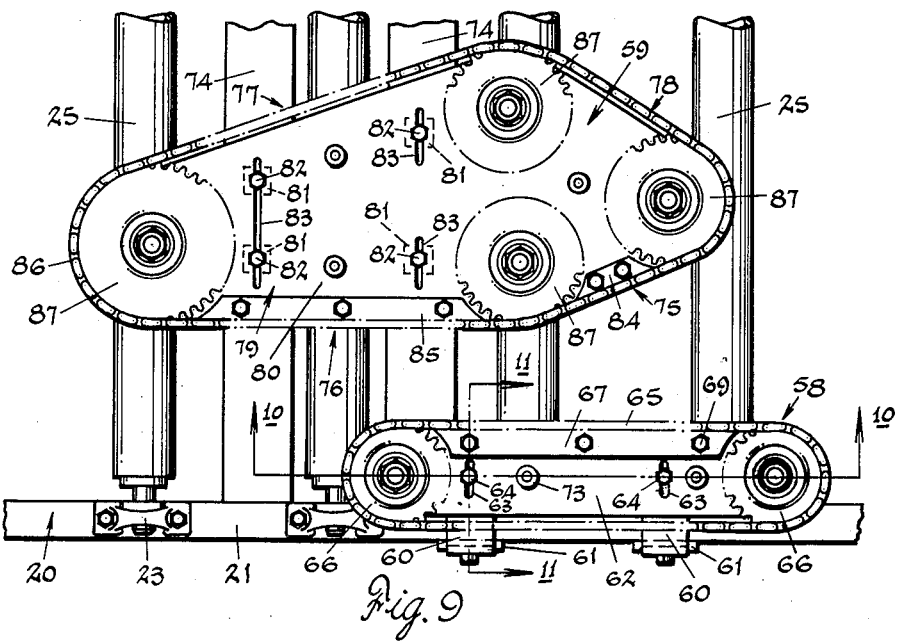

April 14, 1964  G. F. RITTER, JR  3,129,088
BENT GLASS SHEET HANDLING
Filed Oct. 30, 1961  15 Sheets-Sheet 7

INVENTOR.
George F. Ritter, Jr.
BY
Nobbe & Swope
ATTORNEYS

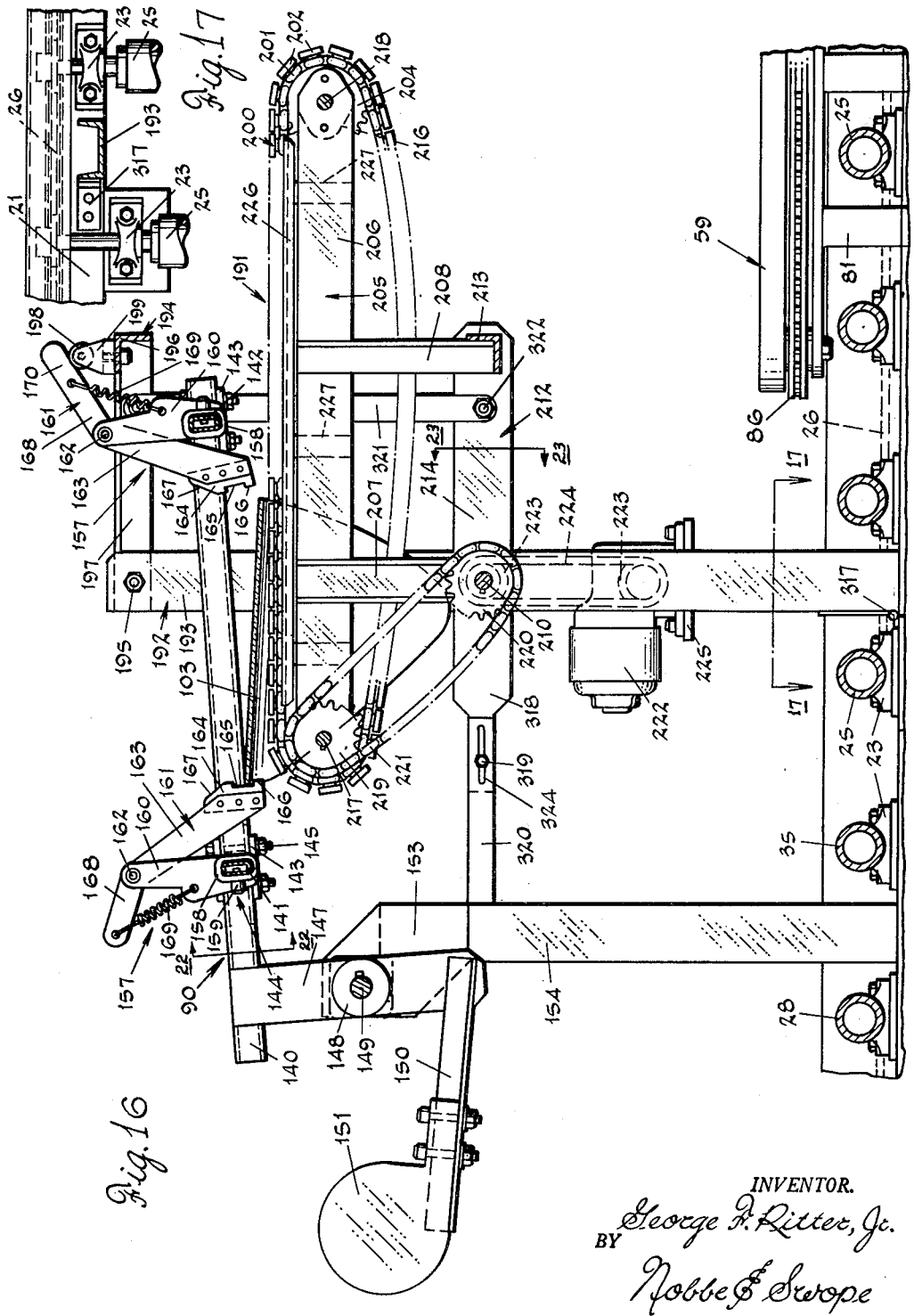

April 14, 1964  G. F. RITTER, JR  3,129,088
BENT GLASS SHEET HANDLING
Filed Oct. 30, 1961  15 Sheets-Sheet 9

INVENTOR.
George F. Ritter, Jr.
BY
Nobbe & Swope
ATTORNEYS

April 14, 1964 G. F. RITTER, JR 3,129,088
BENT GLASS SHEET HANDLING
Filed Oct. 30, 1961 15 Sheets-Sheet 10
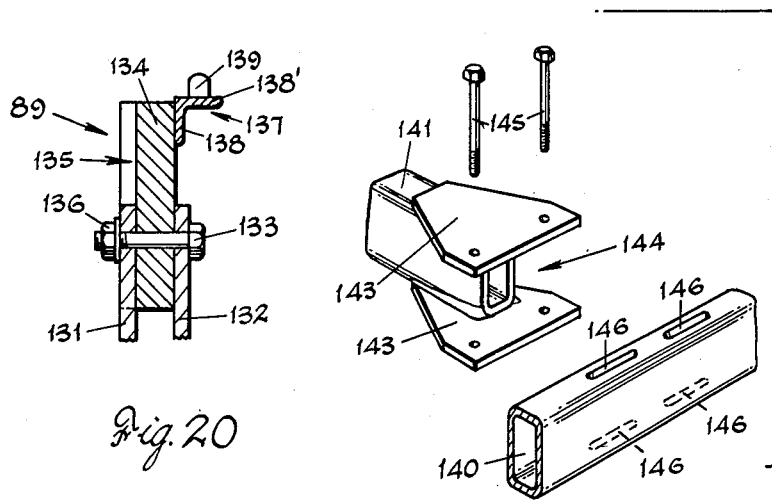
Fig. 20
Fig. 21
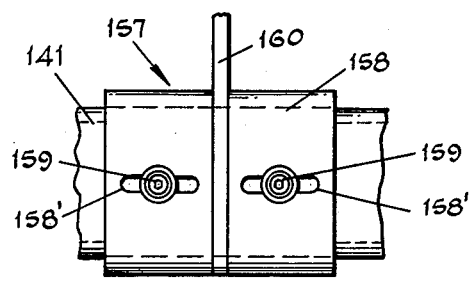
Fig. 22
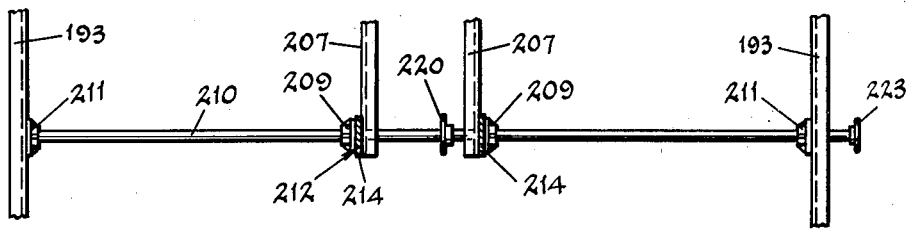
Fig. 23
INVENTOR.
George F. Ritter, Jr.
BY
Nobbe & Swope
ATTORNEYS INVENTOR.
George F. Ritter, Jr.
BY
Nobbe & Swope
ATTORNEYS

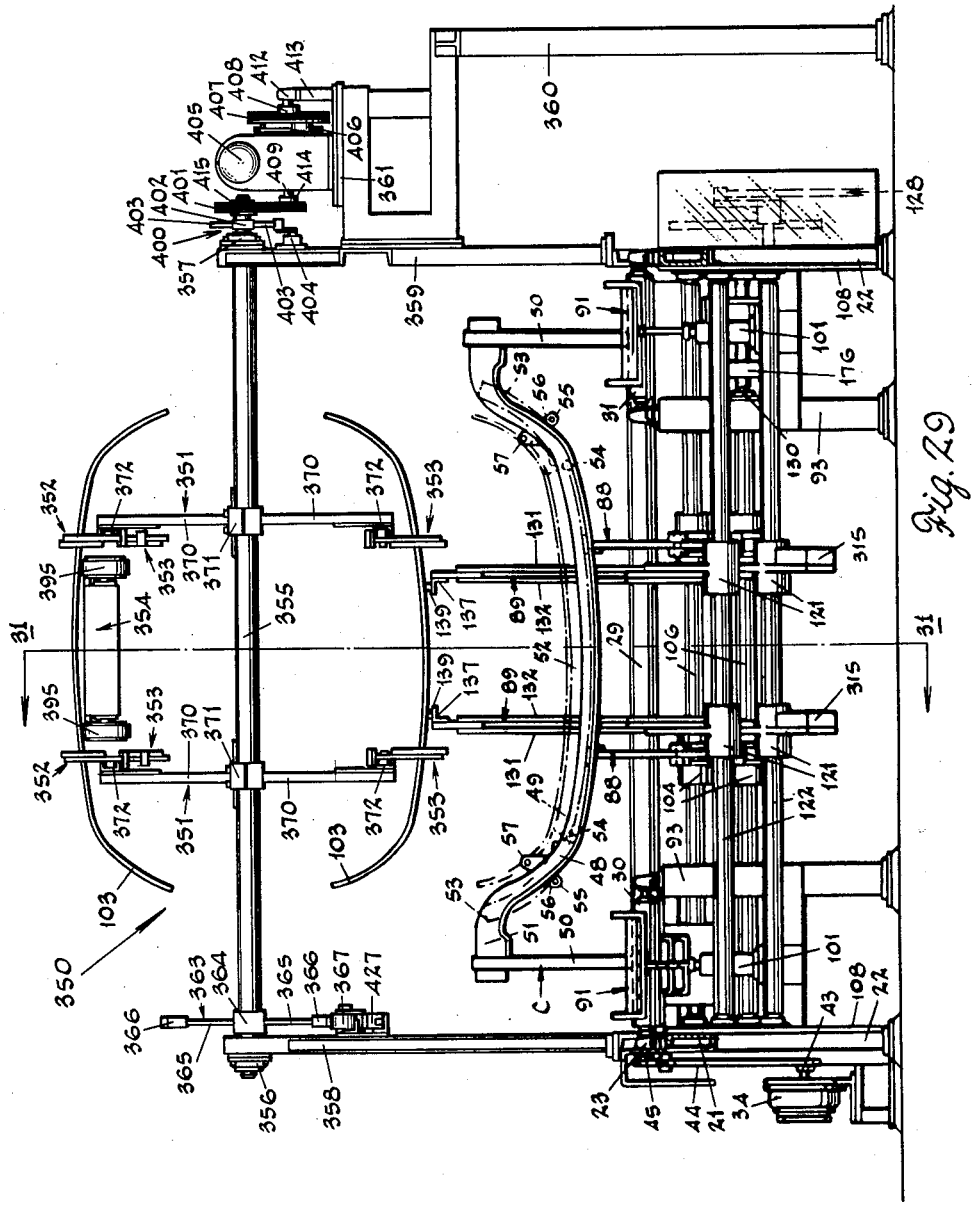

April 14, 1964 G. F. RITTER, JR 3,129,088
BENT GLASS SHEET HANDLING
Filed Oct. 30, 1961 15 Sheets-Sheet 13

INVENTOR.
George F. Ritter, Jr.
BY
Nobbe & Swope
ATTORNEYS

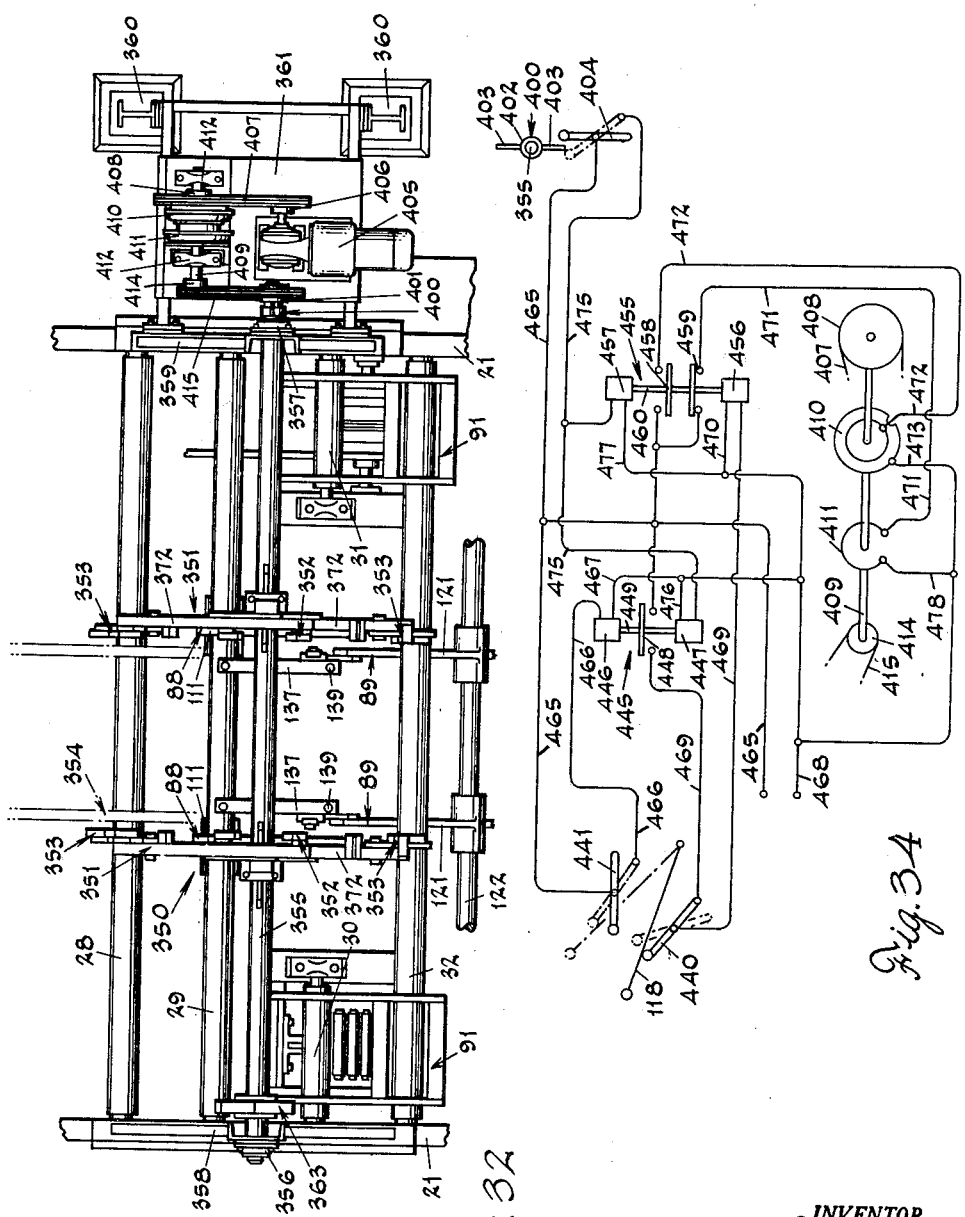

United States Patent Office 3,129,088
Patented Apr. 14, 1964

1

3,129,088
BENT GLASS SHEET HANDLING
George F. Ritter, Jr., Toledo, Ohio, assignor to Libbey-Owens-Ford Glass Company, Toledo, Ohio, a corporation of Ohio
Filed Oct. 30, 1961, Ser. No. 148,524
20 Claims. (Cl. 65—260)

The present invention relates broadly to the automatic handling of bent sheets of glass, plastic and like materials and more particularly is concerned with the removal of bent glass sheets or plates from the bending apparatus on which they have been shaped and the subsequent handling thereof.

This application is a continuation-in-part of copending application Serial No. 679,163, filed August 20, 1957, now abandoned.

Briefly stated, handling devices constructed in accordance with this invention are adapted to be employed in and as a part of conveyor systems used in connection with continuously operating glass bending furnaces. According to this manner of producing bent glass sheets such as are used in the automobile industry, a flat glass sheet or plate is loaded onto a bending apparatus that is then carried in a substantially endless circuitous path through the bending furnace and back to the loading area. Before arriving in this area, however, the glass sheets, that have been suitably bent, are unloaded from the bending apparatus and this operation, as well as that of loading the sheets, has heretofore been carried out on a manual basis. The purpose of handling devices as herein disclosed is to remove the bent sheets without manual intervention and thus improve production and working conditions.

The chief aim of this invention therefore is to provide a handling device adapted to function in a substantially automatic manner and transfer bent sheets of glass, plastic or like materials from one conveying means to another conveying means.

Another object of the invention is to provide a handling device for bent sheet articles which automatically will effect their removal from a support in a rapid manner and without necessitating the interruption in movement of subsequent supports.

Another object of the invention is to provide in a handling device of the above character means for aligning the support for a bent sheet article with reference to a specific area at which the article is to be removed.

Another object of the invention is to provide in such a handling device means for temporarily arresting movement of an aligned support and automatically initiating a cycle of operation wherein the support is engaged to release a supported bent article while a further means removes the article therefrom.

A specific object of the invention is to provide a handling device for bent sheets of glass, plastic or the like wherein a support, such as a bending apparatus, is aligned while being carried forwardly toward an unloading area; is engaged in an upward movement to release a bent sheet of glass which is then automatically raised to an elevated level at which it is received by means adapted to remove the same to a further means of conveyance.

A further object of the invention is to provide a control mean for a handling device of the above character which means is adapted to automatically initiate and terminate a cycle of removal for glass sheets whereby the bending apparatus for glass sheets may be halted at the beginning of such a cycle and released for further forward movement before the actual completion of the transfer of glass sheet to a further conveying means.

A still further object of the invention is to provide means in a handling device of the above character for modifying the same whereby the sheet to be removed can be diverted into several paths of further conveyance.

Other objects and advantages of the invention will become more apparent during the course of the following description when read in connection with the accompanying drawings.

In the drawings wherein like numerals are employed to designate like parts throughout the same:

FIG. 6 is a plan view of the handling device;

FIG. 7 is a vertical longitudinal view of the sheet handling device as taken on line 7—7 of FIG. 6;

FIG. 8 is a vertical longitudinal view as taken on line 8—8 of FIG. 6;

FIG. 9 is a fragmentary plan view of aligning members for the sheet handling device;

FIG. 10 is a vertical longitudinal sectional view taken on line 10—10 of FIG. 9;

FIG. 11 is a vertical, transverse sectional view taken on line 11—11 of FIG. 9;

FIG. 16 is a vertical, longitudinal detail view of the bent sheet transfer mechanism and as taken on line 16—16 of FIG. 6;

FIG. 17 is a detail view as taken on line 17—17 of FIG. 16;

FIG. 20 is a vertical transverse sectional view of the glass sheet lifting device taken on line 20—20 of FIG. 15;

FIG. 21 is an exploded perspective view of parts of the transfer mechanism;

FIG. 22 is a vertical cross-sectional view taken on line 22—22 of FIG. 16;

FIG. 23 is a vertical transverse sectional view taken on line 23—23 of FIG. 16;

FIG. 29 is a vertical transverse sectional view of a modified form of the sheet handling device;

FIG. 32 is a fragmentary plan view of the modified form of handling device;

FIG. 34 is a diagrammatic view of an electric system for producing automatic operation of the modified form of sheet handling device.

Figure 1:
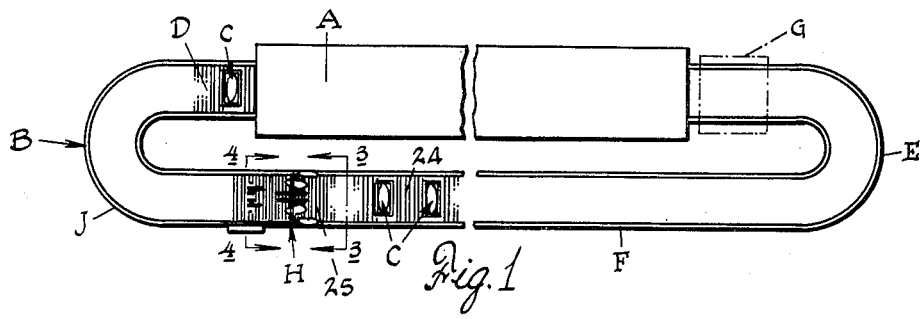
FIG. 1 is a plan view of a conventional bending furnace and including a bent glass sheet handling device constructed in accordance with this invention.
Figure 2:
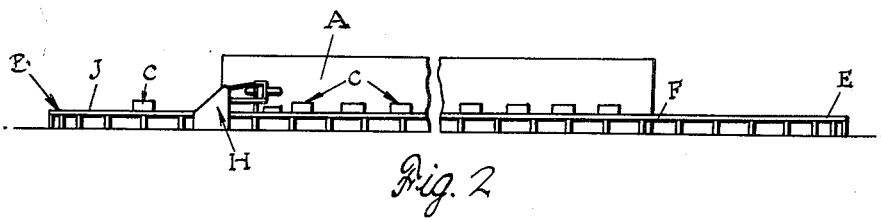
FIG. 2 is a side elevational view of the bending furnace.

With more particular reference to the drawings, there is shown in FIGS. 1 and 2 a conventional type of furnace A utilized in the bending of sheet or plate glass. Generally stated, such furnaces includes an endless loop conveyor B a portion of which extends through and is located in the furnace A. The conveyor, having a plurality of power-driven rolls, is adapted to move a series of bending apparatus C from a loading area, indicated at D, into and through the furnace A to a point at which the apparatus tranverse a semi-circular roll conveyor section E from which they are directed into a straight return roll conveyor section F of considerable length. If desired, between the exit end of the furnace A and the semi-circular conveyor section E, a chilling apparatus may be suitably disposed, as indicated by the letter G, for the purpose of producing tempered glass sheets immediately after they have been bent. Continuing along the straight conveyor section F, the bending apparatus arrives at an area H within which the bent glass sheets are removed from the molds of the said apparatus C which then enters a second semi-circular roll conveyor section J and is returned to the glass loading area D.

It is to be more or less expected that due to working in these areas exposed to relatively high temperatures required for the proper bending of glass, there will be a frequent substitution of the working personnel since in present practice, operators are required for both the loading of the flat glass sheets onto the molds of the bending apparatus and the eventual unloading of the bent sheets therefrom. To release some operators from the hot atmospheres and yet to remove the bent glass sheets, in a satisfactorily automatic manner, as the bending apparatus continuously traverse the endless conveyor B, it has been found that removal of the said sheets can be carried out by a device which is set in motion by each bending apparatus in succession and as they reach the area, generally designated by the letter H.

For this purpose, there is interposed in the conveyor B a device having cooperating mechanism which are adapted to open the bending mold; elevate the bent glass sheet thereabove, and, in an overhand swinging motion, transfer the sheet to a conveyor which carries the same into a cooling area.

Figure 3:
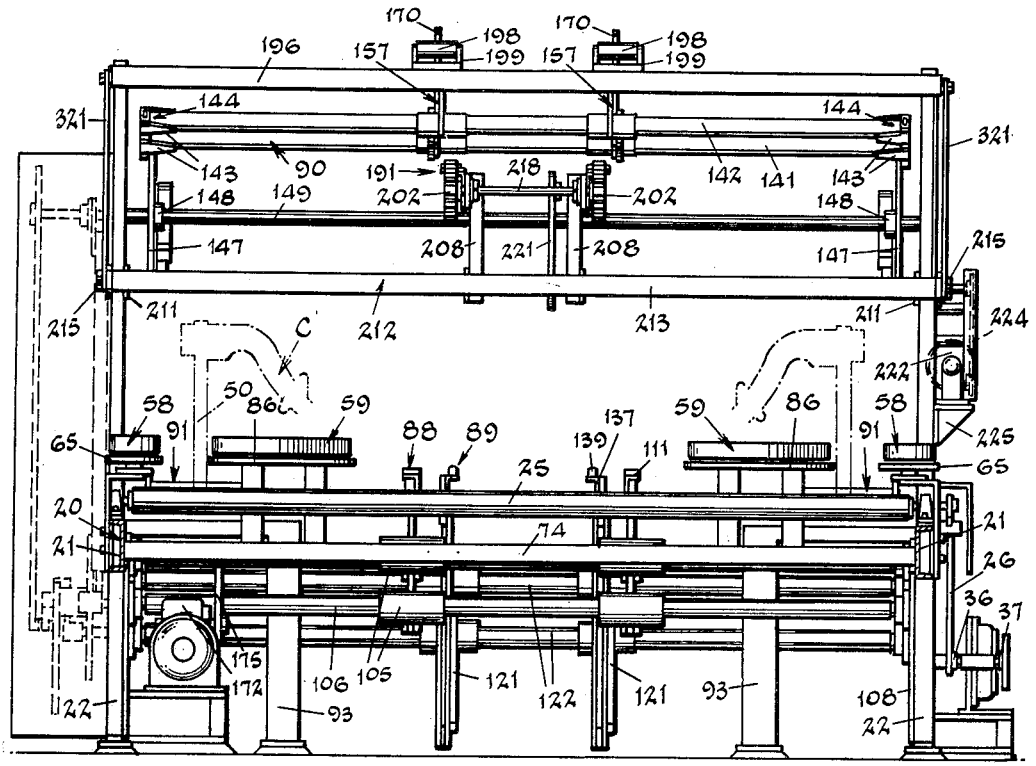
FIG. 3 is a vertical, transverse sectional view of the bent sheet handling device as taken on line 3—3 of FIG. 1.
Figure 5:
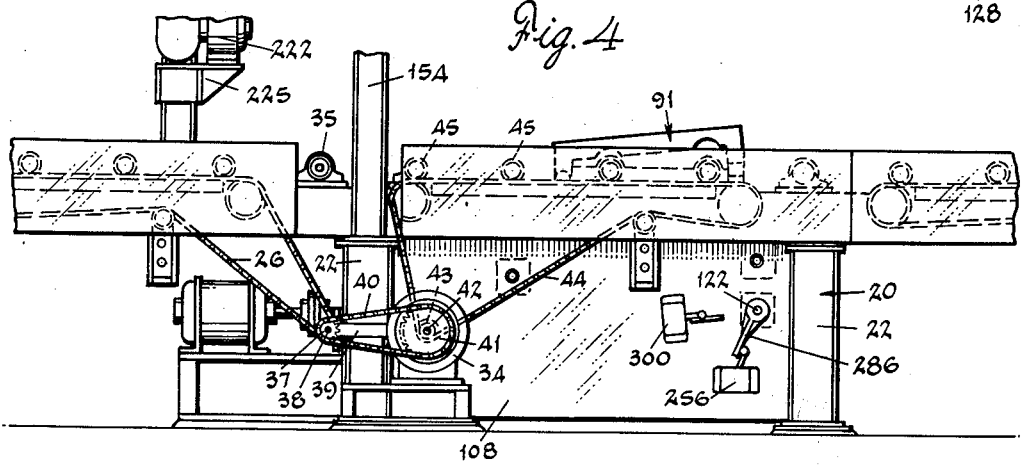
FIG. 5 is an elevational view of the sheet handling device as viewed from the left side of FIG. 4.

Referring now to FIG. 6, there is shown a plan view of the bent glass sheet handling apparatus which is generally comprised of a frame structure 20 having aligned, horizontally disposed channels 21 that are supported on the upper ends of vertically disposed pedestals 22 (FIGS. 3 and 5). The channels may be continuing portions of the general framework of the return section F of the roll conveyor B. In this capacity, the channels carry pillow bearings 23 in which the ends of the rolls 24 are journaled. To control the roll speed, it has been found preferable to separate the source of power for driving rolls 25 from a similar source for rolls 24 to the end that in the entry section of the handling device the forward motion of the bending apparatus can be accelerated and then in the actual area of removal a slower rate of speed can be maintained. This advances each bending apparatus from those approcahing in the return conveyor section F and as well decreases the motion of the apparatus as it is brought to a halt.

For this purpose, the rolls, each indicated by the numeral 25, are driven through a sprocket chain 26 from a source of power 27 (FIGS. 5 and 7) while the rollers 28 to 33, inclusive (FIG. 6), are operatively driven by sprocket chain 26 through an automatically controlled magnetic clutch 34. Between the most proximate roll 25 and the roll 28, there is provided an idler roll 35 which enables the transfer of the bending apparatus between the zones of different speeds to be accomplished with ease and a lesser chance of frictional wear. Operation of the rolls 28—33 is normally obtained from the chain 26 (FIGS. 5 and 7) through sprockets 36 and 37 on a shaft 38 journaled in bracket 39. Sprocket 37, through sprocket chain 40, drives sprocket 41 of relatively larger pitch diameter on the drive shaft portion 42 of magnetic clutch 34 while sprocket 43 on the driven shaft portion operates sprocket chain 44 which in the conventional manner operates sprockets 45 associated with one end of rolls 28, 29, 30 and 32. Since sprockets 37 and 41 are of different diameters, the drive of sprocket 43 will be materially reduced as is desired. Also, in a manner to be hereinafter more clearly described, when a bending apparatus C is properly located in the handling device, the clutch 34 is disengaged to halt the rolls 28 and 33 inclusive.

Figure 12:
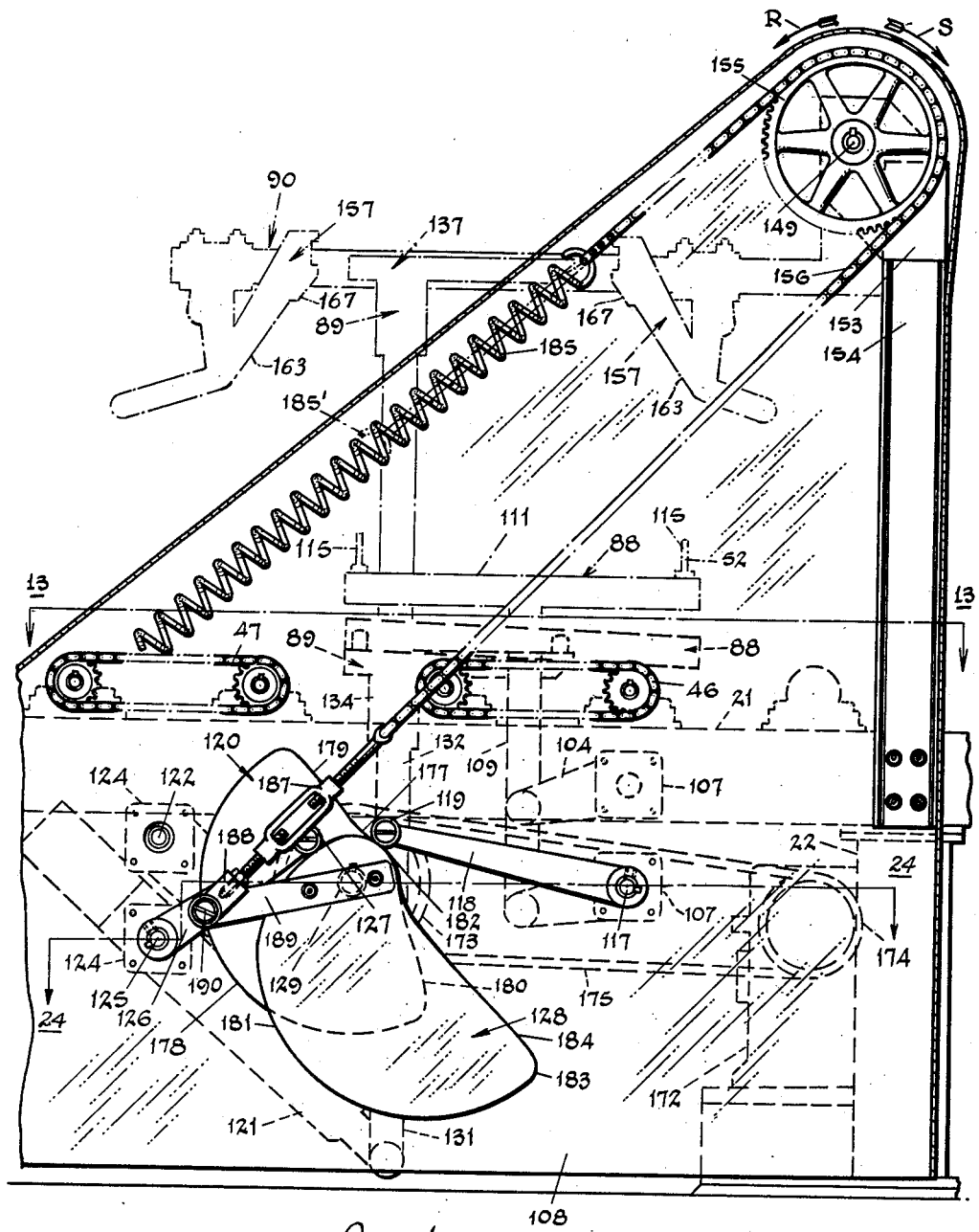
FIG. 12 is a vertical longitudinal view of the bent sheet transfer actuating mechanism.
Figure 13:
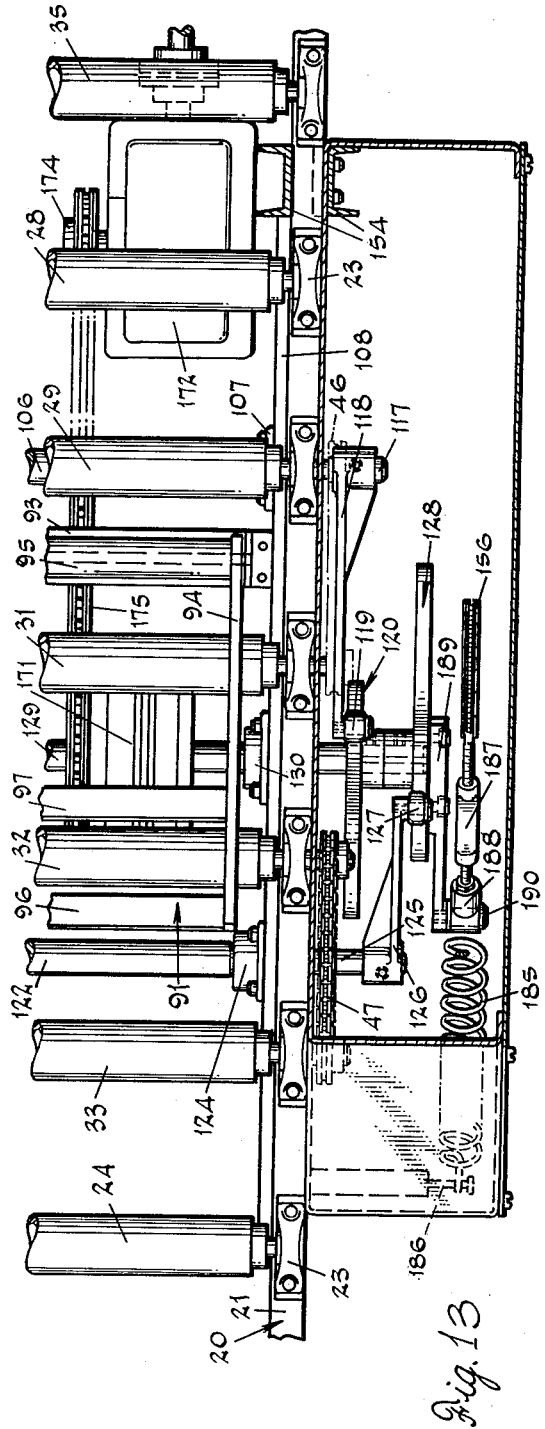
FIG. 13 is a horizontal sectional view of the actuating mechanism as taken on line 13—13 of FIG. 12.

As may be seen in FIG. 6, rollers 30 and 31 are comparatively short and while roll 30 is driven by chain 44, the transversely disposed roll 31 is driven from the roller 29 through the chain 46 (FIGS. 6, 12 and 13). Likewise the roll 33 is driven from the roller 32 by sprocket chain 47 in a similar manner.

Figure 4:
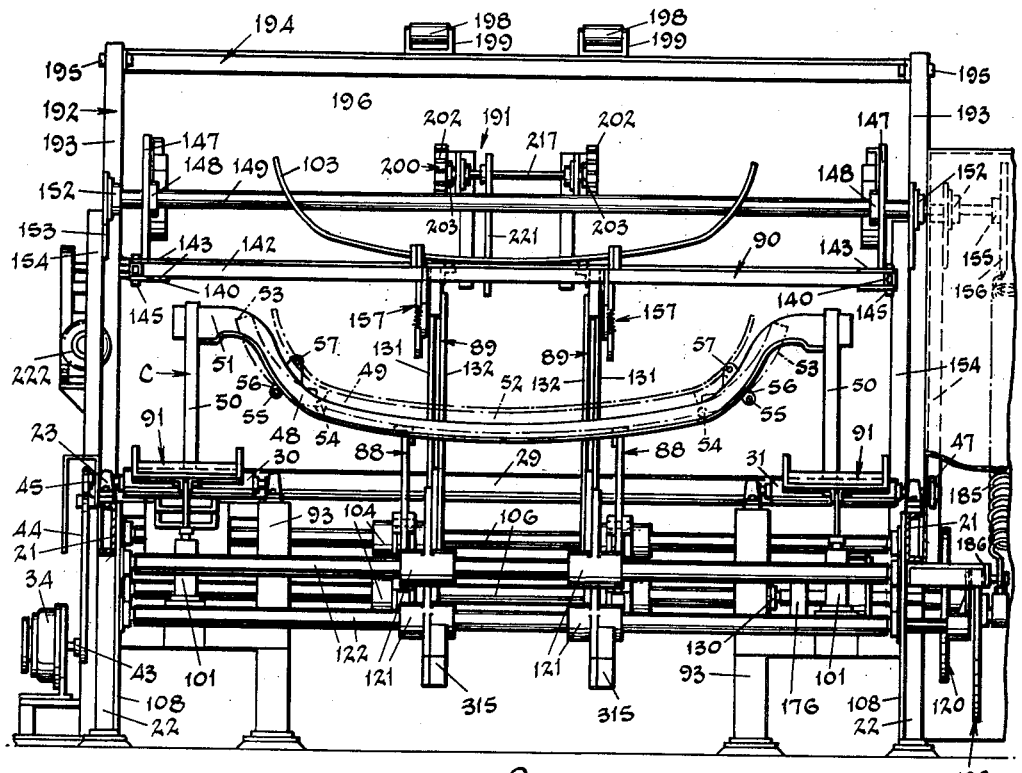
FIG. 4 is a vertical, transverse sectional view of the sheet handling device as taken on line 4—4 of FIG. 1.

As herein disclosed, a common type of bending apparatus, especially employed in the bending of glass plates or sheets, which are tempered after the actual bending operation, comprises a rack 48 and mold 49. As shown in FIG. 4, the rack has oppositely disposed end frames 50 and fixedly mounted side rails 51 positioned therebetween. The mold carried thereon consists of a central section 52 and end sections 53 that are pivotally swingable relative to the central mold section by means of hinges, indicated at 54. The mold is bodily carried on the rack 48 by transversely disposed rods 55 fixed to the end mold sections 53 and supported at their ends in the lower ends of links 56 which are suspended at their upper ends on rods 57 mounted on the side rails 51 of the rack 48. As is well known in the art, the hinged mold 49 is adapted to be moved to an open position to receive a flat sheet or plate of glass and then, as the glass softens in the bending furnace, return to a closed position to shape the softened sheet to the desired bent contour.

Now as the bending apparatus C are carried along in the return conveyor section F, and in a leftward direction as viewed in FIG. 1, it is only natural to assume that some, if not all, of the apparatus will become shifted from a regularly aligned path of travel substantially centered in the longitudinal axis of the conveyor. Thus the racks 48 of the several apparatus C may be positioned transversely toward one side or the other of the conveyor structure and even become shifted to a "skewed" position in which event one forwardly directed corner of a rack 48 will "lead."

To alleviate this situation, means is provided in the form of so-called "freely" moving walls which are adapted to carry the moving bending apparatus in a directive path to either shift the same transversely or correct the "skewed" or angled position into which it has unavoidably become moved. For this purpose, aligning members (FIGS. 3 and 6) are located in pairs at the entry area of the handling device H and are generally designated by the numerals 58 and 59. These members are elevated above the plane of the conveyor rolls 25 and are substantially equally spaced from the longitudinal axis of the conveyor line. As seen in FIGS. 3 and 6, the aligning members 58 are arranged substantially above the ends of the rolls 25 while the aligning members 59 are located inwardly thereof and more or less centrally between the ends of the rolls.

The members 58 are substantially rectangular in outline while the aligning members 59 are generally diamond shaped in plan. Each of the members are equipped with articulated belts that are adapted to be freely movable and to be engaged by the end frames 50 of the racks 48 of the bending apparatus C. Thus, as shown in broken line K in FIG. 6, in the event that a bending apparatus has inadvertently become shifted transversely endwise an end frame thereof will be engaged by the belt of the aligning member 59 in the path of its movement. As the bending apparatus is carried forwardly, the end frame will move along an outwardly directed, angularly disposed surface which will urge said end frame transversely in the direction of arrow L until the properly aligned position has been reached. Likewise in the event that the bending apparatus has become angled or "skewed" from a normally expected position, as indicated in the same figure by the letter M, an end frame 50 of the bending apparatus will become engaged by a freely movable belt of one or the other of the aligning members 58 and this will continue until the opposite end frame is engaged by the oppositely located aligning member 59 substantially in a direction as indicated by the letter N.

More specifically, each of the aligning members 58 is generally mounted on brackets 60 that are adjustably secured on guide plates 61 attached to the side channels 21 of the conveyor frame 20 (FIGS. 9 and 11). Base frames 62 secured to the brackets 60 are substantially rectangular and each is equipped with slots 63 through which bolts 64 are threaded into the brackets 60. By means of the bolts 64, the aligning members 58 are adapted to be initially and/or later adjusted in their spaced relation. Such positions may either be in parallel with the longitudinal axis of the conveyor or at a slight inwardly directed angle. This slight angular position will act to guide the moving bending apparatus to more centralized positions of movement.

The "freely" moving surface of each member 58 is formed by a sprocket chain 65 which is entrained about rotatably mounted sprockets 66 at the ends of the base 62. The inwardly directed flight of the chains 65 is backed up by a rail 67 that is adjustably secured on blocks 68 (FIGS. 9 and 11) by bolts 69. Preferably the rail is sufficiently thin to engage only the rollers 70 of the chain 65 while the edge surfaces of the links 71 afford the actual aligning surface for the outer surfaces of the end frames 50 of the racks 48 as indicated in broken line in FIG. 11. The sprockets 66 and chain 65 may be more or less protected from accumulations of dirt by means of shields 72 carried by posts 73 mounted on the base frames 62.

On the other hand, the aligning members 59 are mounted bodily on channels 74 positioned transversely of and fixedly carried by the frame channels 21. Each of these members in plan (FIG. 9) is, as stated, generally diamond shaped having an outwardly angled surface 75 blending and continuing into a straight surface 76 which is arranged in parallel with the longitudinal axis of the conveyor. The respective surfaces 76 of the members 58 are oppositely arranged and the spaced distance of their parallel relation is established according to the length of the bending apparatus. The outline of the device is completed by angularly disposed surfaces 77 and 78.

The base frame 79 of the member 59 (FIG. 9) is accordingly generally shaped to conform to these surfaces and comprises a horizontally disposed plate 80 carried by vertically disposed posts 81 mounted on the channels 74. The plate 80 is adjustably secured to the posts 81 by means of bolts 82 passed through slots 83 in said plate. Upon loosening of bolts 82, plate 80 may be shifted transversely until the respective straight surfaces 76 of the aligning members 58 are spaced apart the desired distance.

Each plate 80 carries guide rails 84 and 85; the rail 84 being arranged in parallel with the angled surface 75 and the rail 85 with the straight surface 76. The rails 84 and 85 are mounted in substantially the same manner as the rails 67 of the aligning members 58 and similarly adjusted. The rails 84 and 85 thus function as supports for the sprocket chain 86 and bear the thrust of the bending apparatus racks thereagainst. As shown in FIG. 9, the chain 86 is entrained about several rotatably mounted sprockets 87 and the effective flights thereof are along surfaces 75 and 76 in which areas it is supported by rails 84 and 85.

The essential reason for accurately positioning the bending apparatus C is to assure that each of a continuous progression of the bending apparatus will enter the glass sheet removal area in a substantially exact position relative to the removing members. As shown in FIGS. 4, 6 and 7, these removing members will be seen to consist of a mold opening device 88, a glass sheet lifting device 89 and a glass sheet transfer frame 90.

Figure 14:
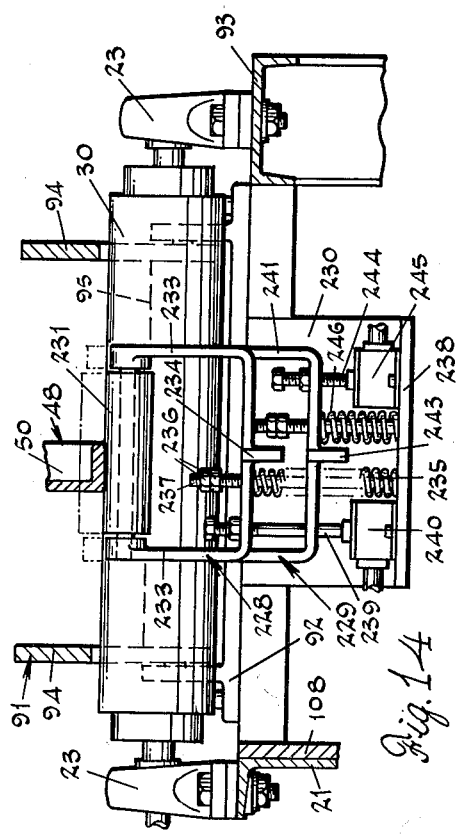
FIG. 14 is a vertical transverse detail view of control members of the sheet handling device.

Now, as a bending apparatus 48 reaches the exact unloading or glass removal area, further forward motion is arrested by means of locking frames generally designated by the numeral 91 in FIGS. 6, 8 and 14. These frames are generally U-shaped and are located above the short rolls 30—31 and end portions of the roll 32. More especially, the frames 91 are pivotally mounted at one of their ends on brackets 92 (FIG. 8) supported on auxiliary frame structures 93 which also support the innermost journal bearings 23 for the short rolls 30 and 31. The frames 91 consist of side rails 94 interconnected at one of their ends by a sleeve 95 carried by brackets 92 and disposed in alignment with the adjacent rolls 29, 30 and 31. At their opposite ends, the side rails 94 are joined by a transversely disposed end rail 96, aligned with the sleeve 95 and located between rolls 32 and 33. Suitably positioned between the sleeve 95 and end rail 96, each frame is equipped with a transverse cross-bar 97. Midway between side rails 94, each end rail 96 is equipped on its undersurface with a bracket 98 which by pin 99 is connected to the piston rod 100 of a cylinder 101. The cylinders are each mounted on brackets 102 carried by frame structures 93 and are adapted, in their rest position, to support the locking frames 91 in an upwardly inclined position to locate the integral cross-bar 97 substantially above the plane of rolls 30, 31 and 32 and in the path of a forwardly moving bending apparatus.

Accordingly, when the leading ends of the rack 48 are engaged by said bars 97, forward motion of the bending apparatus C will be halted in a generally centralized area of the handling device to the end that the mold 49 and a bent glass sheet or plate 103 carried thereon are suitably located over the mold opening device 88 and glass sheet lifting device 89. At this instant of operation, the electro-magnetic clutch 34 is disengaged and the rolls 28 to 33 inclusive become stationary, as will be hereinafter more clearly set forth in detail.

*Mold Opening Device*

The opening device 88 for the mold 49 of bending apparatus C comprises (FIGS. 6 and 7) pairs of arms 104 having hubs 105 mounted on rockshafts 106 that are journaled at their opposite ends in bearings 107 carried on vertically disposed plates 108 attached to channels 21 and pedestals 22. The shafts 106 are located one above the other in a vertical plane and the outer end of each of the pair of arms 104 is adapted to pivotally support a vertically disposed bar 109 by means of pins 110. This arrangement substantially provides a parallelogram form of motion whereby radial swinging operation of the arms 104 will raise and lower their related bar 109 in a vertical plane.

Each pair of arms 104 is mounted on respective shaft 106 at equally spaced points from the longitudinal axis of the conveyor and by means of bars 109 are adapted to engage and raise the central section 52 of the bending mold 49. By raising this central section of the mold, the end sections 53 will be caused to pivot on the rods 55, in the customary manner, while swinging outwardly with respect to the central section 52 at hinges 54. This action spreads the said end mold sections from the associated end areas of the bent glass sheet 103, as is indicated in broken line in FIG. 4, and so that the bent sheet can be freely lifted therefrom.

Figure 15:
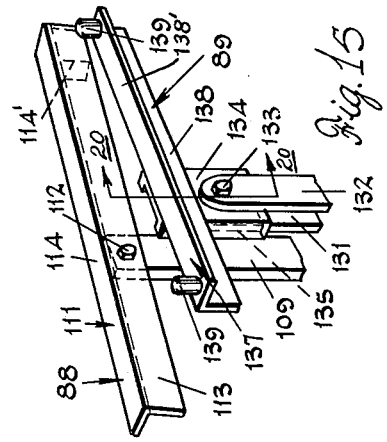
FIG. 15 is a fragmentary perspective view of the mold opening and glass sheet lifting devices.

For this purpose, each bar 109 is equipped with a substantially horizontally disposed bar or angle 111 that is pivotally supported on the upper end of the bar on a bolt 112 (FIG. 15). The angle or opener bar 111 is preferably mounted with reference to its center of balance so that in the rest position said bar will assume a position slightly inclined to a horizontal plane. The opener bar 111 is mounted by its vertically disposed leg 113 on bolt 112 in an area off-set from its center of balance and by its horizontally disposed leg 114, is adapted to rest in an inclined plane on the oppositely disposed upper end corner of bar 109. A weight 114' can be added to the opener bar to insure this inclination of positioning, if desired. The purpose for so supporting the opener bar 111 is to enable the same to accommodate its functional position of balance to a plane which is common to the underneath surfaces of the rails 115 forming the central mold section 52. This will tend to compensate for any irregularity in the mold surfaces and equalize the force of the upward thrust at four spaced points along the underneath surfaces of the rails.

The hubs 105 of arms 104, associated with the lowermost shaft 106, are fixed thereon by keys 116 (FIG. 7) and this shaft is provided with an outwardly extending axle portion 117 of reduced diameter on which is mounted a cam actuatable lever 118 (FIGS. 12 and 13). The lever 118 is equipped at its outer end with a roller 119 which is adapted to contact the periphery of a cam 120 fixedly mounted on shaft 129. Upon rotation of said cam, as will be more fully described, the lever 118 will rotate the axle 117 and related lower shaft 106 and, since the pairs of arms 104 are interjoined by the related bars 109, each of the associated shafts 106 will be rotated thus causing arms 104 to raise and then lower their respective bars 109 and the opener bars 111 from and to the positions of FIGS. 3 and 4.

Sheet Lifting Device

The glass sheet lifting device 89, as best seen in FIGS. 6, 12 and 15, is constructed similarly to the device 88 in that it is comprised of pairs of arms 121 mounted on rockshafts 122 that are arranged one above the other in a vertical plane. More particularly, a pair of arms 121 are located on each of the shafts 122 in transversely, outwardly spaced relation from each of the arms 104 on shafts 106 and the arms 121 associated with the lowermost shaft 122 are keyed thereon at 123. The shafts 122 are journaled at their ends in bearings 124 (FIG. 12) mounted on plates 108 and the lowermost shaft has an outwardly extended axle portion 125 on which a lever 126 is fixedly carried. The lever 126 is provided in its outer end with a roller 127 which is adapted to engage a cam 128 which is fixedly mounted on shaft 129 with the above-mentioned cam 120 (FIG. 13). The shaft 129 is journaled in bearings 130 mounted on adjacent plate 108 and frame structure 93.

The outer end of each arm 121 is pivotally connected to a pair of associated, vertically disposed bars 131 and 132 (FIGS. 6 and 15). The upper ends of the bars 131 and 132 are interconnected by a bolt 133 passed through a block 134. This block is provided with a grooved surface 135 in which the end of bar 131 is received which affords a substantially rigid connection between the block and the bars when the nut 136 on bolt 133 is securely turned. The block has affixed to its upper end, an angle which constitutes the glass lifting member 137 of the lifting device 89 (FIG. 15). This angle is secured to the block 134 by its vertically disposed leg 138 and on the horizontally disposed leg 138' has mounted a pair of spaced plugs 139 which are of wood, rubber or like materials adapted to engage a glass surface without scratching or otherwise marring the same.

The angle or lifting bar 137, while rigidly attached to the block 134, is positioned so that practically three-quarters of its length is located on one side of the block, as will appear in FIG. 7. This enables the lifting bars 137 to be carried upwardly in arcuately described paths of movement and to thus pass between the opposed rails 115 of the central mold section 52 without interference. The lifting bars 137 are thus adapted to rise between the rails 115 (FIG. 12) of the central mold section 52; remove the glass sheet 103 therefrom and lift it into position to be received by the transfer frame 90.

Sheet Transfer Frame

The glass sheet transfer frame 90 as seen in FIGS. 6, 7, 16 and 21 is constructed of two tubular bars 140 arranged in parallel with one another and with the longitudinal axis of the conveyor. The bars 140 are interconnected by transversely disposed tubular bars 141 and 142 provided on the upper and lower surfaces of each of their opposite ends with substantially triangular or gusset plates 143. Each pair of plates 143 forms (FIG. 21) a yoke 144 for receiving and mounting the bars 140 therebetween and each plate is provided with aligned openings for receiving securing bolts 145. The bars 140 preferably are provided with slots 146 through which the bolts 145 are movable relative to said bars to adjust the spacing between the bars 141 and 142. This enables the transfer frame 90 to be easily and rapidly adjusted to accommodate glass sheets of different widths when a change in production occurs.

Adjacent the ends of bars 140 opposite the bar 142 downwardly directed, vertically disposed mounting plates 147 (FIG. 16) are attached; said plates having hubs 148 for receiving a shaft 149. At its lowermost end each plate 147 has a rigidly connected angle 150 on which is adjustably mounted a weight 151. The relative position and amplitude of the weights 151 is determined to equalize and counterbalance the weight of the transfer frame 90 and the sheet of glass 103 carried thereon.

Shaft 149 is preferably keyed to the hubs 148 of plates 147 and outwardly thereof is journaled at its opposite ends in bearings 152 (FIG. 4) mounted on plates 153 forming integral parts of vertically disposed channels or columns 154. These columns are structurally attached at their lower ends to the side channels 21. One end of shaft 149 is extended outwardly from the associated bearings 152 and has a sprocket 155 fixedly mounted thereon. The sprocket 155 is actively rotated by oppositely disposed instrumentalities which are interconnected by a sprocket chain 156 trained about said sprocket and which will be more fully hereinafter described. The sprocket 155 turns the shaft 149 and consequently the transfer frame 90 between the position as illustrated in FIG. 7 and the position thereof in FIG. 16.

The bars 141 and 142 of the glass sheet transfer frame 90 carry adjustably mounted sheet gripping devices generally designated in FIG. 16 by the numeral 157. Broadly speaking, each device consists of a tubular base 158 equipped with slots 158' (FIG. 22) in which securing screws 159 are located and threaded into tapped holes in the respective bars 141 and 142 (FIG. 22). By means of the screws, the bases 158 can be slidably adjusted along each of the bars and then secured in their adjusted position. The sheet gripping devices 157 are transversely movable inwardly and outwardly from the longitudinal axis of the handling device in order that bent sheets of different lengths can be properly balanced during the lifting operation and from the transverse axis thereof.

Rising from the upper surface of each base 158 as viewed in FIG. 16, there is a vertically disposed plate 160 which pivotally carries at its upper end a dog-leg shaped lever 161 by means of a pin 162. These levers 161 are mounted on bars 141 and 142 in longitudinally aligned pairs and the respective leg portions 163 thereof are directed inwardly in opposition to each other, in associated pairs. Each leg portion 163 carries a block of fiber, or like material 164 having a rectangular notch 165 formed in an inwardly directed, vertically disposed surface 166. A second surface 167 of each block 164 is disposed at an obtuse angle to the plane of the surface 166. Surface 167 is also located outwardly from the adjacent edge of the leg portion 163 to protect the glass edges from striking the adjoining edge of said leg portion. The pairs of levers 161, as shown in FIGS. 7 and 12, are thus arranged in the planes of a convergent angle and, as will be more fully hereinafter described, will be engaged by a sheet 103, as it is raised by lifting device 89, along the respective surfaces 167. This will cause said levers 161 to pivot on pins 162 until the upward thrust of the glass sheet has spread the levers apart sufficiently for the sheet along its opposed marginal edges to enter notches 165.

Referring again to FIG. 16, the opposite leg portion 168 of levers 161 is adapted to receive one end of a coil spring 169 whose opposite end is similarly retained at plate 160. In the instance of the pair of levers 161 associated with the gripping devices 157 on bar 142, the leg portions 168 have outwardly extended end portions 170. The springs 169, at rest, operate to position the levers 161 so that the notches 165 in blocks 164, at the ends thereof, can be spaced apart sufficiently to retain a sheet of glass therebetween. Otherwise the springs are momentarily placed in tension as a glass sheet, as above described, is caused to traverse the block surfaces 167 until the opposed marginal edges of the sheet have forced the levers 161 to swing apart until said edges are received in said notches.

There is of course a mechanically functioning co-relation between the pivotal rising and falling motions of the arms 104 of the mold opening device 88 and of the arms 121 of the sheet lifting device 89, and the sheet transfer frame 90. This is achieved by means of the above-mentioned cams 120 and 128 which are fixedly keyed on the shaft 129 (FIGS. 12 and 13).

Figure 24:
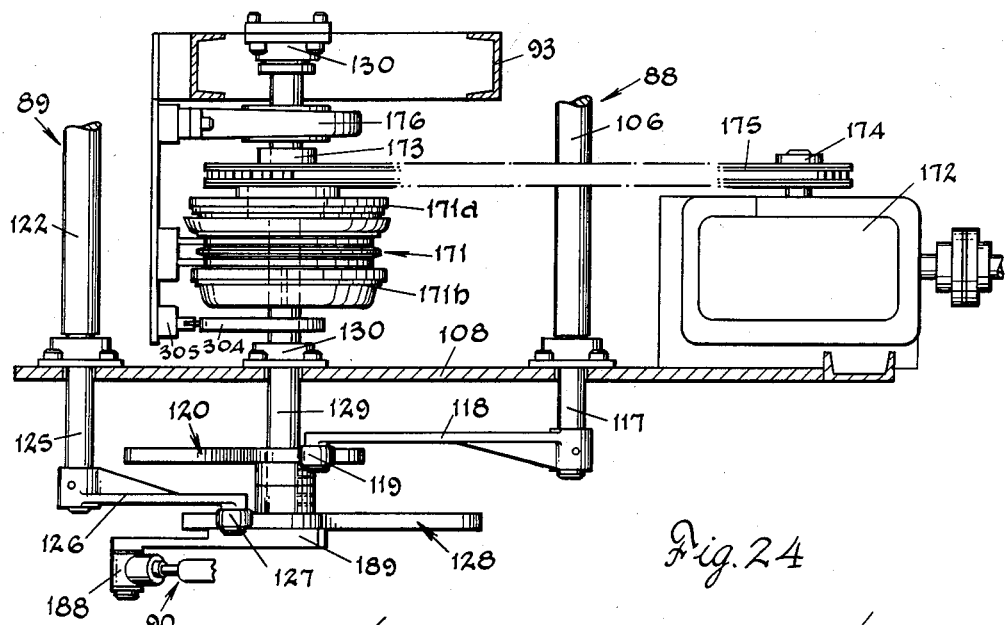
FIG. 24 is a horizontal section taken substantially on line 24—24 of FIG. 12.

The shaft 129 is journaled in bearings 130, mounted on a frame structure 93 and plate 108, and, inwardly of said plate, carries an electro-magnetic clutch 171. As viewed in FIG. 24, the free-running or driver portion 171a of this clutch is supported by a suitable, contained bearing (not shown) on the shaft while the driven portion 171b is conventionally keyed to said shaft. The driver portion 171a is continuously operated by a gear-reduction unit 172 through a sprocket 173 secured to said driver portion, a sprocket 174 carried by the out-put shaft of unit 172 and a chain 175 trained thereabout. A suitable magnetic brake, generally indicated at 176 and mounted on the frame structure 93, is provided to stop the shaft 129 after the completion of one rotation, when the clutch portions 171a and 171b are disengaged. The shaft 129 will therefore be positively driven by the clutch 171 from the gear-reducing unit 172 when the clutch portions 171a and 171b are engaged and during alternate de-energization of the brake 176, but will likewise be stopped substantially instantaneously when the electrical circuits (FIG. 19) to the clutch and brake are reversed. This insures that the shaft 129, and more particularly the cams 120 and 128 turning therewith, will again be located in their original positions pending the initiation of a subsequent cycle of operation.

Now referring to FIGS. 12 and 25 to 28, the timing relation between cams 120 and 128 will be seen to sequentially raise the lever 118 associated with the mold opening device 88; raise the lever 126 associated with the sheet lifting device 89; lower the lever 126 and then lower the lever 118. More particularly, the cam 120 has a developed contour which includes a circular periphery 177 of relatively small radius and a similar circular periphery 178 of considerably greater radius and which occupies essentially more than half of the cam contour. These surfaces 177 and 178 generally are interconnected by a cam rise surface 179 and fall 180; the extent of the surface 179 being the actual amount of pivotal movement to be imparted to the shafts 106 through lever 118. The cam surface 177 thus constitutes the idle or "dwell" portion of the cycle of operation of cam 120 when the mold opening device 88 is in its lowered position while the surface 178 represents the operative "dwell" portion of the cycle when the opening device 88 is raised to maintain the mold 49 in its open position.

On the other hand, cam 128 is developed to produce a rapid pivotal movement of the related shaft 125 through lever 126 and for this purpose has an arcuately generated peripheral portion 181 increasing rapidly from a circular dwell sector 182 of relatively small radius to a peak 183 and then by a substantially straight descending sector 184 to the dwell sector 182. The arcuate portion 181 thereof produces a rapidly occurring pivotal motion of shaft 122 in substantially half the rotation of cam 128 to move the sheet lifting device 89 upwardly.

Thus, cam 120 initially causes the mold opener bars 111 of device 88 to raise, engage the rails 115 of mold 49 and lift the same to open the mold in advance of the cam 128 which through the above-described arms 121 on shafts 122 causes the lifter bars 137 of device 89 to rise radially upwardly and between rails 115 into engagement with the undersurface of the glass sheet and to elevate the same into and between the gripping devices 157 of the transfer frame 90, as will be seen in FIGS. 4 and 7. This is also brought out diagrammatically in FIG. 25 upon comparison of the 0° position with the 90° position of clockwise rotation in FIG. 26. Further, as the shaft 129 rotates cams 120 and 128 to the 150° position, FIG. 27, the roller 127 of arm 126 will have reached the high peak area 183 of cam 128 while the roller 119 of arm 118 will be traversing the surface 178 of cam 120. Likewise cam 128 causes a rapid descent of lifting bars 137 to their lowermost rest position in advance of the action of cam 120 to lower opener bars 111 which operates to permit closure of the mold sections 52 and 53. This is as shown at the 240° position of the shaft and cams in FIG. 28. It may also be noted that, upon lifting of the central mold section 52, the bars 111 also operate to assist the locking frames 91 in maintaining the bending apparatus C in a relatively fixed position.

From the start of rotation of cams 120 and 128 and while the mold opening device 88 and glass lifting device 89 are becoming functionally active, the transfer frame 90 is swung from a rest position in which a sheet of glass is discharged (FIG. 16) to the receiving position, indicated in broken line in FIG. 12.

Preferably the swinging operation of the frame 90 to the position indicated in FIG. 12 occurs quite rapidly in order that the frame will be "at rest" before the lifting device 89 reaches the upper limit of its stroke. However, during the second half of the cycles of the cams 120 and 128, the frame 90, carrying a sheet of glass 103, swings rearwardly in a steady rate of motion until it arrives at the rest position shown in FIG. 16.

As herein provided, the chain 156 (FIG. 12) trained about the sprocket 155 on the frame support shaft 149 is connected at one end to a comparatively long coil spring 185 whose opposite end is fixed at a post 186 mounted generally on an adjacent side channel 21 (FIG. 4). The opposite end of chain 156 is connected through an adjusting means, such as the turn-buckle 187, to a block 188 connected to a bar 189 by an axle or shouldered bolt 190. The bar 189 is fixedly mounted on the face of the cam 128 and during rotation of the cams (120 and 128), in a clock-wise direction, is radially carried or swung by cam 128 so that the spring 185, normally under tension, is enabled to contract and thus operate to pull the chain 156 and so rotate the sprocket 155 in a counter-clockwise direction, indicated by arrow R (FIG. 12). The approximate length of contraction may be understood to be from the end of the spring in full line to the spring end as in broken line as indicated at 185'. The relation of the bar 189 to the generated surface 181 of cam 128 is such that the frame 90 by shaft 149 will be swung to the receiving position indicated in broken line in advance of lifting of the glass sheet 103 by the lifting device 89 also shown in broken line to this elevation.

Figures 25, 27:
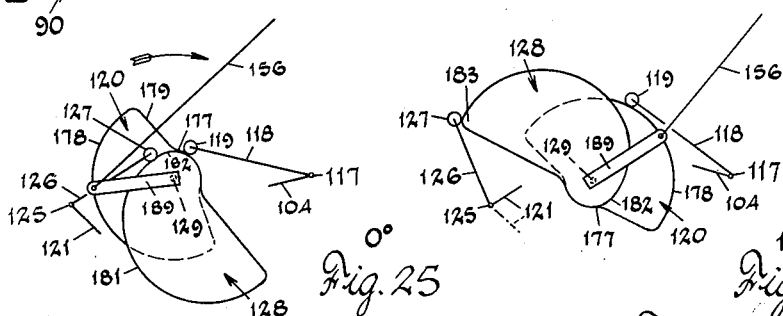
FIGS. 25 to 28 are diagrammatic views showing successive positions of the actuating mechanism for the bent sheet handling devices.

Now as the roller 127 of lever 126 reaches and traverses the peak area 183 of cam 128, see FIG. 27, the marginal edges of the sheet will be slidably urged upwardly along the surfaces 167 of the fiber blocks 164. This accomplishes two important functions; primarily, in the event that the bending apparatus has previously been inadvertently jarred so as to slightly displace the sheet transversely of its supported position with reference to the mold surfaces such displacement will be remedied upon engagement of one edge or the other of the sheet with a surface 167 which will cause the sheet to be laterally shifted slightly, in one direction or the other, on the plugs 139 of lifting bars 137 and according to which marginal edge of the glass sheet first engages a surface 167 of the blocks 164; secondly, a balanced, upward movement of the sheet's edges against the surfaces 167 of the several blocks 164 operates to pivotally swing the leg portions 163 of levers 161 outwardly against the tension of their related springs 169 until the said marginal edges are received in the notches 165 of the opposed pairs of blocks 164 at which time the springs act to swing the levers inwardly to firmly grip the glass sheet in the notches 165 of the blocks 164.

As the cams 120 and 128, and especially the cam 128 to which the bar 189 is attached, rotate so that the roller 127 traverses the descending section 184 thereof, the bar 189 will be swung radially to a point at which it operates to pull the sprocket chain 156 against the tension of spring 185 and to rotate the sprocket 155 in a reverse or clock-wise direction as indicated by the arrow S (FIG. 12). This swings the transfer frame 90 through a similar clock-wise directed arc toward the discharge position shown in FIG. 16. Also, the complete descent of the lifting device 89 is substantially immediately followed by the descent of the mold opening device 88 as in FIG. 28 which occurs as the roller 119 on lever 118 and roller 127 on lever 126 enter the dwell surfaces 177 and 182 of the cams 120 and 128 respectively. At this interval in the transfer cycle, the lock frames 91 are lowered and the clutch 34 is again engaged to move the bending apparatus forwardly toward the semi-circular end section J and thence to the loading area D at which point a subsequent flat glass sheet is loaded preparatory to bending.

Referring now to FIG. 16, the transfer frame 90 is shown in its rest position and a bent sheet of glass 103 diagrammatically illustrated as being released from the transfer frame and deposited on a take-off conveyor, generally designated by the numeral 191. The conveyor 141 is bodily supported on a superstructure framework 192 mounted on the oppositely disposed channels 21 of the conveyor framework 20. This framework has vertically disposed columns 193 on the outer surfaces of which a U-shape frame 194 is pivotally mounted on bolts 195 at the uppermost ends of said columns. The frame 194, as best seen in plan in FIG. 6, has a central, transversely disposed section 196 and longitudinally located end sections 197 associated with columns 193 by bolts 195.

The central span or section 196 of the frame 194 carries rollers 198 journaled in brackets 199 and arranged substantially in the path of the gripping devices 157 on the bar 142 of the transfer frame 90. As shown in FIG. 16, the rollers 198 are adapted to be engaged by the extended ends 170 of the respective levers 161 and maintain rolling contact therewith while acting to interrupt their further downward motion in accompaniment with the remainder of the frame 90. This of course actually only affects the particular levers 161 to the end that during the further downward motion of the frame 90, the lever's leg portions 163 are caused to swing outwardly on pins 162 against the tension of springs 169 and thus withdraw the blocks 164 on said leg portions 163 from their engaged relation with the proximate marginal edge of the bent sheet 103. Accordingly, the said edge is released and drops onto the moving conveyor 191 which then carries the sheet 103 to an area where it is received on a secondary conveyor system T shown in broken line in FIG. 7. It is to be appreciated that the main conveyor B in this figure is moving bending apparatus in a leftward direction and, although in no wise necessary to the purposes or utility of the invention, the indicated secondary conveyor T is operated to move the removed bent sheets of glass in a rightward direction to an area in which they may be further processed.

In any event, the glass sheet 103 in dropping onto the conveyor 191 in the vicinity of one marginal edge will be carried in such a manner as to withdraw the opposite marginal edge of the sheet from the associated supporting blocks 164 whereupon the sheet bodily will descend onto and be carried on said conveyor. The conveyor 191 has two substantially endless belts 200 of sprocket chain 201 and supporting blocks 202 mounted thereon in a conventional manner to present a substantially continuous surface in particularly the upper flight of the chains 201. The chain 201 of each belt 200 is entrained about sprockets 203 and 204 that are located at the respective ends of a conveyor frame 205. This frame is formed by longitudinally disposed plates 206 integrally mounted on the upper ends of pairs of vertically disposed columns 207 and 208.

The transversely aligned columns 207 are provided at their lower ends with bearings 209 (FIG. 6) in which a shaft 210 is journaled; the shaft being further journaled in bearings 211 on the columns 193 at its opposite ends and thus being substantially supported by and supporting the columns 207 at bearings 211. The columns 208 are aligned with the columns 207 and at their respective lower ends are fixedly mounted on a U-shaped frame 212. This frame 212 has a transversely disposed angle section 213 joined at its ends to plates 214. The plates 214 are equipped with bearings 215 through which the ends of shaft 210 extend.

The plates 206 on the columns 207 and 208 carry bearings 216 at their opposite ends, which bearings rotatably support shafts 217 and 218. Shafts 217 and 218 carry the sprockets 203 and 204 respectively and shaft 217 further carries a drive sprocket 219. Sprocket 219 is coupled to a sprocket 220 on shaft 210 by chain 221. The shaft 210 thus is the source of power for the conveyor belts 200 and is driven from a gear unit 222 through the sprockets 223 and chain 224. For reasons to be hereinafter disclosed, the gear unit 222 is mounted on a bracket 225 carried by the adjacent column 193.

To sustain the weight of the bent glass sheet 103, the upper flights of the sprocket chains 201 traverse tracks or platforms 226 that are mounted by braces 227 on the outwardly directed surfaces of the plates 206.

The bending apparatus C, which in substantially continuous sequences of movement along the conveyor B, are accordingly carried into the removal area of the handling device H and are halted in their motion by the locking frames 91. In order to progressively stop rotation of the rolls 28—33 in the area of the device H; to open the mold 49 of the bending apparatus by the opening device 88; to raise the bent glass sheet 103 therefrom by the lifting device 89 until it is received between the gripping devices 157 of the transfer frame 90 and then release of the bending apparatus for resumption of its forward motion while the sheet 103 is delivered to the secondary conveyor T, obviously requires the use of several control switches which are located so as to operate or be actuated sequentially in order that the entire cycle of operation will be carried out in a substantially automatic manner. Thus, several of the required switch controls are shown throughout various figures of the drawings and somewhat more diagrammatically in FIG. 19.

Now, as a bending apparatus C enters the removal area of the handling device H, the oppositely disposed end frames 50 simultaneously are engaged by the cross-bars 97 of the locking frames 91 and the further forward movement thereof is halted although the conveyor rolls 28—33 are still actively driven by chain 44 from electromagnetic clutch 34 which, when engaged, drives the chain generally from chain 26, as previously described. At this time, one of the frames 50 has passed over and rests upon two switch control levers 228 and 229. As shown in FIGS. 8 and 14, especially, these levers are pivotally mounted on a bracket 230 which is supported on a frame structure 93. The lever 228 is adapted to support rollers 231 and 232 by means of L-shaped and outwardly disposed arms 233 integrally formed with the main arm 234 of the lever. The arm 234 is flexibly supported in its uppermost position by means of a spring 235 and this position can be adjusted by locknuts 236 on a vertically disposed threaded rod 237 about which spring 235 is located. The rod 237 is threaded, at its lower end, into a platform portion 238 of bracket 230. One arm 233 also carries a rod 239 threaded through said arm and adapted at its lower end to actuate a switch 240.

The lever 229, likewise, has arms 241 for supporting a roller 242 and a main lever arm 243 pivotally supported on bracket 230 and on which an actuating rod 244 for switch 245 is carried. Similarly too, a spring 246 is adapted to support lever 229 in its uppermost position. As viewed in FIGS. 6 and 8, it will be seen that levers 228 and 229 are located between rolls 30 and 32 while a control lever 247 for switch 248 is located between rolls 32 and 33. Lever 247 is pivotally supported on a bracket 249, mounted on the plate 108, and is constructed similarly to either of the levers 228 and 229. It is also to be noted that roller 242 is located substantially centrally between the rollers 231—232 of lever 228.

Figures 18, 19:
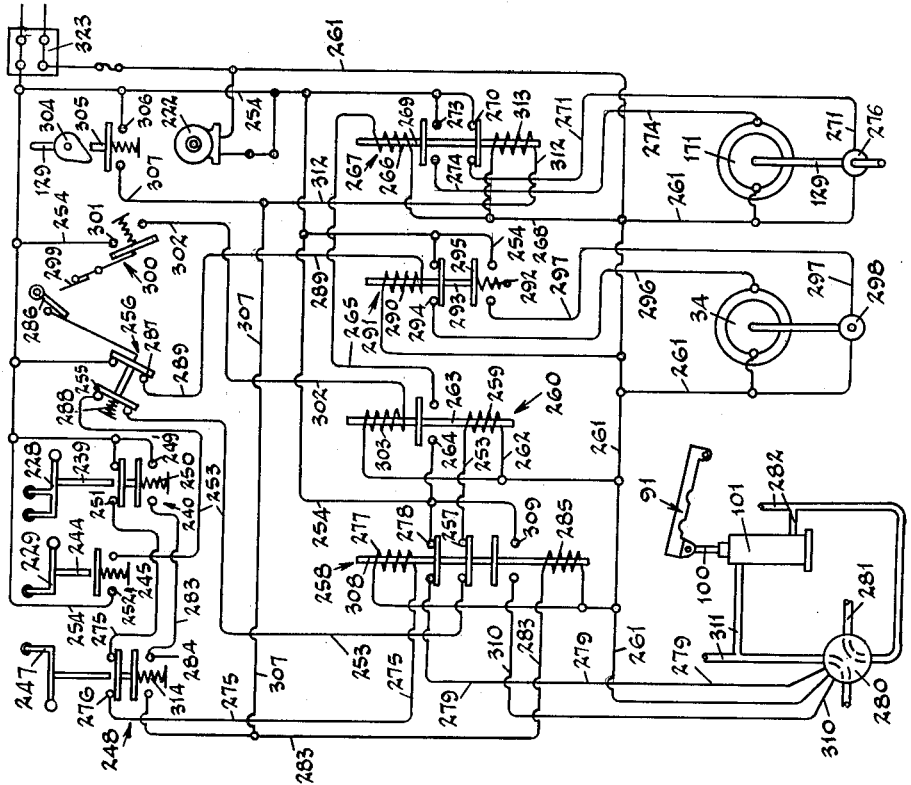
FIG. 18 is a side elevational view of the transfer mechanism in a modified position.
FIG. 19 is a diagrammatic view of an electric system for producing automatic operation of the bent glass sheet handling device.

Referring to FIG. 19, when the levers 228 and 229 are depressed by pressure of an end frame 50, the rod 239 of lever 228 actuates its associated switch 240 to close contacts 249' thereof against the bias of spring 250 while the rod 244 of lever 229 operates the contacts 252 of switch 245 to complete a line 253 from one source 254, through normally closed contacts 255 of switch 256 and closed contacts 257 of switch 258 to a coil 259 of relay switch 260; the coil being connected to a second source 261 by line 262. When energized, coil 259 moves armature 263 to close contacts 264 and complete a circuit from source 254 by line 265 through coil 266 of relay switch 267 to second source 261 by line 268. The armature 269 of switch 267 separates contacts 270 to open circuit line 271 from source 254 through brake 176 for clutch 171 to second source 261 and simultaneously closes contacts 273 to establish circuit line 274 from source 254 through electro-magnetic clutch 171 and thence to second source 261. When so engaged, the driver portion 171a of said clutch, operating from gear reduction unit 172 through chain 175, is engaged with the driven portion 171b thereof to operatively rotate shaft 129 on which cams 120 and 128 are fixedly mounted.

At this time also, the contacts 251 of switch 240 are separated by downward action of rod 239 and open a circuit line 275 through normally closed contacts 276 of switch 248 and through the coil 277 of relay switch 258 to second source 261. Contact 278 of this switch normally completes a circuit by line 279 from source 254 to one side of a valve 280 and thence to second source 261. During closure of contacts 278, the valve 280 supplies pressure from pipe 281 to the lower end of each of the cylinders 101 by pipes 282 to support the locking frames 91 in their uppermost positions.

At this phase of the removal cycle, the switch contacts 251 of switch 240 are open while the contacts 249' thereof are presently closed so that line 283 from source 254 is completed to the normally open contacts 284 of switch 248. Line 283 connects to coil 285 of relay switch 258. The contacts 249'—284 and 250—276 of the switches 240 and 248, respectively, are connected in interlocking relation for purposes to be more fully hereinafter disclosed.

Now, as the shaft 129 rotates the cams 120 and 128, the lowermost shaft 122 is pivotally rocked and so raises the sheet lifting device 89 through operation of the lever 126. Simultaneously a lever 286, fixedly mounted on the opposite end of this particular shaft 122 releases its control over the switch 256, mounted on the outer surface of adjacent plate 108 (FIG. 5). Pairs of contacts 255 and 287 of switch 256 are separated by spring 288 which opens circuit line 289 from the source 254, through the coil 290 of relay switch 291 to second source 261. De-energizing coil 290 permits spring 292 to move armature 293 to separate contacts 294 and close contacts 295. Contacts 294 normally complete circuit line 296 from source 254 through electro-magnetic clutch 34 to second source 261 while contacts 295, when closed, connect sources 254—261 by line 297 through brake 298 for the clutch 34. Disengagement of this clutch halts the drive to rolls 28—33 through chain 45 and the purpose for momentarily continuing operation of these rolls after the start of the removal cycle is to insure that the end frames 50 of the mold rack 48 which have been brought squarely up to and against the cross-bars 97 of the locking devices 91 will be still urged against the cross-bars during the initiation of the cycle.

As the lever 286 is swung from its holding position relative to the switch 256, it passes the flipper arm 299 of a switch 300. The arm, conventionally, is adapted to remain inactive when passed in one direction and to then actuate said switch when passed from the opposite direction. Thus, when the lever 126 has been carried pivotally to the extremity of its arcuate motion by the cam 128, the roller 127 thereof passes the cam peak 183 and descends on the section 184 toward the dwell or idle section 182. The lever 126 accordingly effects rotation of the shaft 122 and lever 286 and, in the second phase of its pivotal cycle, operates to lower the lifting device 89 and swing the lever 286 so as to actively engage switch arm 299 and operate the switch 300. The contacts 301 thereof complete line 302 from source 254 through coil 303 of relay switch 260 to second source 261. This action influences armature 263 to separate contacts 264 and open line 265 from the source 254 to coil 266 of relay switch 267 thereby resetting the relay switch 260 for a subsequently occurring cycle. Since contacts 255 of switch 256 are presently open, the line 253 will remain inactive even though switch 245, being held closed by the depression of lever 229, should tend to otherwise re-energize coil 266.

Now as the end of the cycle approaches, the transfer frame 90 is swinging the bent glass sheet 103 toward and onto the conveyor 191; the sheet lifting device 89 is lowered followed by descent of the mold opening device 88 and the cam shaft 129 is completing one full revolution. At this time, a rotary cam 304 on shaft 129, see FIGS. 19 and 24, engages switch 305 to momentarily close contacts 306 thereof. These contacts complete circuit line 307 from source 254 through coil 285 of relay switch 258 by line 283 to second source 261. Being energized, coil 285 influences armature 308 to separate contacts 278 to open line 279 while closing contacts 309 to establish line 310 from source 254 through the valve 280 to second source 261. The circuit of line 310 reverses valve 280 to direct pressure from pipe 281 to pipes 311 and the top of cylinders 101. This operates to lower the locking frames 91 and release the bending apparatus C for further forward movement along the conveyor B, into the semi-circular section J and thence to the loading area D preparatory to a repeating bending operation.

Since the actuation of switch 305 occurs practically at the end of the removal cycle, the lever 286 simultaneously re-closes contacts 255—287 of the switch 256. Also by line 312 from line 307 through the coil 313 of relay switch 267 to second source 261, armature 269 is influenced to separate contacts 273 to open line 274 to de-energize the clutch 171 and re-engages contacts 270 thereby activating brake 176 by line 271. Contacts 287 of switch 256 re-establish line 289 whereby coil 290 of relay switch 291 overcomes bias of spring 292 to move armature 293 so as to re-engage contacts 294 while separating contacts 295. Line 296 from contacts 294 to electro-magnetic clutch 34 accordingly, when re-established, engages the same so that chain 44 will resume operation of the rolls 28—33.

As the bending apparatus is carried forwardly by the rolls, the end frame 50, engaging the rollers 231—232 and 242 of the levers 228 and 229 maintains rolling contact therewith, while passing over cross-bars 97 and end rails 96 of the frames 91, and moves toward and depresses lever 247 to actuate switch 248. Since the lever 247 is situated beyond the end rail 96 of this locking frame 91 at this side of the handling device, engagement of the end frame 50 will continue after the following corner of the frame has become separated from, and released, the levers 228 and 229, of course, the roller 231 of the lever 228 will maintain said lever depressed subsequently to separation of the following corner from the roller 232 and the roller 242 of the lever 229. Thus, the circuit of line 283 through contacts 249′ of switch 240 will be completed through contacts 284 of switch 248 when engaged by depression of lever 247. Also when lever 228 is released and contacts 251 of switch 240 re-establish line 275 to coil 277 of relay switch 258, this line (275) will remain open at separated contacts 276 of switch 248. Therefore, until the immediate bending apparatus has been carried out-of-engagement with the roller of lever 247, energization of the coil 277 will be impossible to enable the contacts 278 of switch 258 to reverse the valve 280 and raise the locking frames 91.

The open circumstance of contacts 278 is also reflected in the separation of contacts 257. These, as above described, interlock in the line 253 with contacts 255 of switch 256. Consequently while the locking frames 91 are held in their lowered positions, the line 253 is complete from source 254 through contacts 252 of switch 245 and contacts 255 of switch 256 to one side of separated contacts 257 and is otherwise complete to the second source 261 from the other side of separated contacts 257 through coil 259 of relay switch 260. This feature insures that until the lever 247 is released and subsequently the locking frames 91 are raised, the circuitry for the electro-magnetic clutch 171 will be maintained open.

Also in the event that a succeeding bending apparatus has entered the removal area of the handling device in so close proximity to the existing bending apparatus as to again depress the lever 228 at the roller 232 before the lever 247 is released, the line 275 will remain open at contacts 251 of switch 240. This will prevent the second bending apparatus from activating the line 253 at contacts 252 when lever 229 is depressed. The second bending apparatus is thus passed through the locking frames 91 and in depressing the lever 247 continues the circuitry of line 283 at contacts 284 of the switch 248 to delay raising of the locking frames. Of course, in emergencies of this nature, the bent glass sheet on said second apparatus must be removed manually before the same enters the semi-circular conveyor section J.

However, when the lever 247 is released under any circumstance, spring 314 operates switch 248 to separate contacts 284 thereof and opening line 283 while engaging contacts 276 and closing line 275. The line from source 254, contacts 251 of switch 240, contacts 276 and coil 277 to second source 261 will now reverse the position of armature 308 of relay switch 258 to separate contacts 309 to open line 310 and re-engage contacts 257 and 278. Closure of contacts 257 will not complete line 253 due to the open condition of contacts 252 at switch 245; however, upon closure of contacts 278, line 279 will be re-established to reverse the valve 280 thereby directing pressure through pipes 282 to the lower ends of cylinders 101 and thus raise the locking frames 91. This terminates the actual cycle of the control system of the handling device H when it will be found generally that line 253 to one coil side (259) of relay switch 260 is open at switch 245; line 265 to one coil side (266) of relay switch 267 is open at switch 260; line 271 for brake 176 is closed at switch 267 while line 274 for clutch 171 is open; line 283 for one coil side (285) of relay switch 258 is open at switch 248; line 289 for coil 290 of switch 291 is closed at switch 256; line 296 for clutch 34 is closed at switch 291 while line 297 for brake 298 is open; line 275 for one coil side (277) of switch 258 is closed at switches 240—248; line 279 for one side of valve 280 is closed at switch 258; line 302 to one coil side (303) of relay switch 260 is open at switch 300, while line 310 for the opposite side of valve 280 is open; and lines 307 and 312 to the opposite coil sides (285 and 313) of relay switches 258 and 267 respectively are open at switch 305.

While the over-all operation of a handling device, embodying the features of this invention, is now believed to be quite clearly understood, the rapid and sequentially occurring steps of one cycle may be best illustrated by being briefly restated. Thus, a bending apparatus C carrying a bent sheet of glass 103 from the bending furnace A is moving along the return conveyor section F by rolls 24. At the entry end of the handling device H, the end frame 50 (FIG. 3), at one end or the other end of the rack 49 engages one or the other of the pairs of aligning members 58 and 59. Of course the optimum position for the moving bending apparatus is found when the end frames 50 are substantially equally spaced from the longitudinal axis of the conveyor F. In one way or the other, however, one of the frames 50 will engage along a straight surface 76 of the aligning members 59 which properly "centers" the mold 49 of the bending apparatus. Also, in being moved through the area of the aligning devices, the apparatus is carried by the several rolls 25 that are generally operated from the source of power 27 at a slightly accelerated rate of speed to advance the same into the actual removing area. As well, in moving over idler roll 35, forward progress of the apparatus C is perceptibly slowed by the reduced rate of operation of the rolls 28—31, inclusive.

Moving across the open area between the short rolls 30—31, the leading ends of end frames 50 engage the cross-bars 97 of the locking frames 91 disposed over the outer ends of rolls 30—31 and 32. Now, as previously mentioned, although the apparatus C is halted and the sheet removing cycle is initiated by depression of the levers 228 and 229, the rolls 28—33 are still operatively driven to insure that both frames 50 are firmly engaged by the locking frames 91 and the mold 49 properly positioned above the mold opening device 88 and the sheet lifting device 89.

When the lever 229 is moved downwardly, the related portions of the electro-magnetic clutch 171 are engaged and the brake 176 de-energized, whereby the drive shaft 129 and cams 120 and 128 thereon are operatively rotated from the 0° position of FIG. 25, through one complete revolution. The cam 120, by reason of the initial rapid rise along the surface 179, as in FIG. 26, causes the lever 118 on end 117 of shaft 106 to rotate the same whereby the arms 104 and bars 109 of mold opening device 88 are swung upwardly. This movement carries the bars 111, resting in their inclined rest positions, into engagement with the rails 115 of the central mold section 52. Since each end of bars 111 finally operates on an area of the opposed rails 115 to lift the mold section 52 bodily, the fact that the bars are pivotally mounted on their related bars 109 by bolts 112 enables the bars 111 to equalize the weight of said mold section and carry the same upwardly in a balanced manner. Upward motion of the central mold section is reflected in motion of the end mold sections 53 as they swing on hinges 54 and rods 55 and the mold is opened to a position similar to that in which a flat glass sheet is loaded thereon. As shown in FIG. 4 in the open position, the end sections 53 are spaced outwardly from the respective end areas of the bent glass sheet. While the mold is sustained in its open position by the raised opener bars 111, the bending apparatus is further held in a stationary position.

Following upwardly in a motion slightly retarded from that of bars 109, the lifting bars 137 of the lifting device 89 are raised between the rails 115 so as to engage the sheet 103 by means of the non-abrasive plugs 139 against the lower surface. As the bars 137 approach the upper limit of their vertical movement, the opposite margins of the bent glass sheet slidably engage the surfaces 167 of the blocks 164. This form of engagement along the inclined surfaces serves to accomplish two purposes: first, advanced engagement along one edge of the sheet will produce a slight shifting of the sheet to carry the opposite edge toward the adjacent blocks 164 to thus balance the sheet positional support, and, secondly, as the sheet is lifted, the edges thereof slidably bear against the block surfaces 167 to produce outward swinging motion of the levers 163, against the bias of springs 169, until the said edges simultaneously enter the notches 165 (FIGS. 4 and 12).

The blocks 164 are generally carried on the transfer frame 90 which, at rest, is in the discharge position, shown in FIG. 16; however, since the bar 189 is bodily carried by the cam 128 which controls the upward motion of the lifting device 89, rotation of the cam and bar 189 enables the chain 156 through the tension developed in spring 185 to swing the transfer frame 90 to its position in the path of the upwardly rising glass sheet and in advance of its arrival in this upper area.

Figures 26, 28:
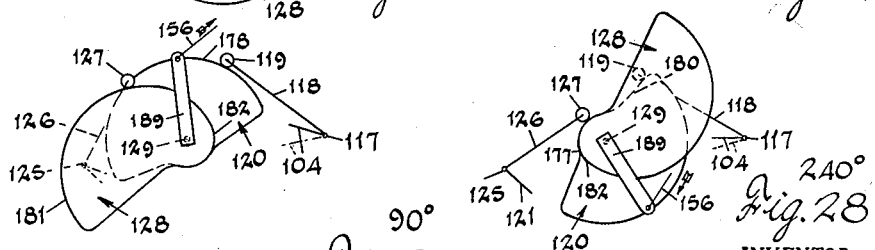
Figure 31:
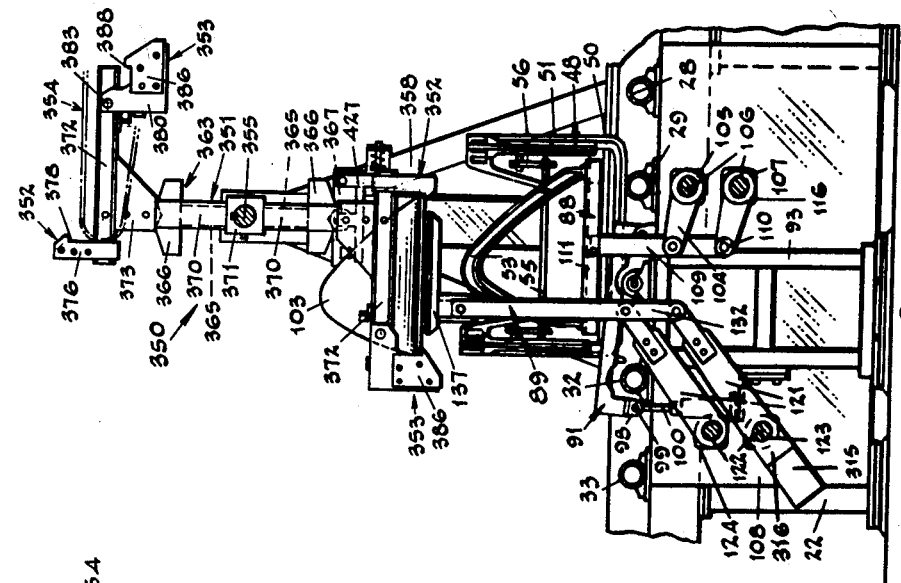
FIG. 31 is a vertical longitudinal view as taken on line 31—31 of FIG. 29.

When the sheet is firmly supported in the gripping devices 157, of which the levers 163 are integral parts, the position of cam 128 is such that especially the lever 126 will rapidly descend to lower the sheet lifting device 89, see FIGS. 27 and 28. If desired, to counterbalance the combined weight of the arms 121, the bars 131 and 132 and the glass sheet 103, weights 315 can be secured to extensions 316 of the lower arms 121 (FIGS. 4 and 7). Substantially in time with the drop of the bars 137 beneath the mold rails 115, the bars 111 of the device 88 are lowered by the action of cam 120. This allows the mold sections 52 and 53 to descend to their closed position. And, as the bars 111 and 137 are lowered, the continued rotation of the bar 189 on cam 128 acts to overcome the tension of spring 185 thereby drawing the chain 156 to revolve sprocket 155 and the transfer frame 90 to be swung to its discharge and rest position.

When the opening device 88 and lifting device 89 are again in their lower rest positions, the lever 286 activates the control switch 256 for re-establishing the drive through electro-magnetic clutch 34 to operate the rolls 28—33 and the locking frames 91 are lowered by cylinders 101. This allows the bending apparatus to proceed forwardly after which the said frames are again raised.

As the transfer frame 90 approaches its discharge position, the extended ends 170 of levers 163 engage rollers 198 and are swung outwardly thereby releasing the adjacent end of the bent glass sheet onto the conveyor 200. This moving conveyor by supporting one side of the sheet acts to withdraw the opposite edge of the sheet from the blocks 164 on which it has been supported. At the final position of rest, the transfer frame is located above the conveyor 200 and levers 163, engaging the rollers 198, remain in their outwardly angled positions. The active parts of the handling device are accordingly each disposed in their respective rest positions until a subsequent bending apparatus C is halted by the locking frames 91 and depresses levers 228 and 229.

As shown in FIG. 18, the positions of several parts of the handling device H can be readily altered in the event that it is desired that the bent glass sheets 103, normally removed by the said device H and carried to the conveyor 200, be manually removed for a different manner of subsequent handling. From the description of frames 194 and 212, it will be recalled that each of the frames is pivotally mounted on the vertically disposed columns 193. In the present construction the columns 193 are mounted on the conveyor channels 21 by hinges 317.

The frame 212 is provided on side plates 214 with extensions 318 bolted as at 319 to plates 320 pivotally attached to columns 154. The frame 212 is also connected, adjacent to its section 213, to the frame 194 adjacent its center section 196 by means of a pair of links 321 suitably attached by trunnion bolts 322. The links 321 are substantially parallel to the columns 193. This creates a substantially rectangular parallelogram arrangement wherein the corners contain pivot support members as the bolts 195, the shaft 210 and the bolts 322.

In the event that the transfer device is to be moved from its operative position as in FIG. 16 to an inoperative position shown in FIG. 18, operation of the handling device H is manually initiated as by depression of the lever 229 to close switch 245 and, as previously described hereinabove, the electro-magnetic clutch 171 is engaged to drive shaft 129 and the cams 120 and 128 thereon. As the bar 189 on cam 128 is turned to rotatively drive the sprocket 155 on shaft 149 and through chain 156 to swing the transfer frame 90 to its discharge position, the lever 229 is released and a manual control switch 323 for source lines 254 and 261 is opened. This act will halt the swinging movement of the frame 90 as at a position arbitrarily shown in FIG. 18.

Now the bolts 319 can be released at the associated plates 318 and 320. This will enable the bolts to slide along slots 324 provided in plates 320. Upon swinging of the columns 193 on hinges 317, the plate extensions 318 will carry said bolts in an arcuately described path but as defined by their traversal of the slots 324. The swinging motion of plate extensions 318 will thus cause the side plates 214 of frame 212 to swing relatively upward on their related support—the shaft 210. Through the links 321, the frame 212 generally will carry the assemblage angularly toward the columns 154 as the columns 193 swing on hinges 317. Since the posts 207 for conveyor frame 205 are supported by bearings 209 on shaft 210 while the posts 208 are rigidly connected to the frames 205 and 212, the conveyor 200 will be likewise swung upwardly. Tightening of the bolts 319 will secure the take-off conveyor 191 bodily in a position as illustrated in FIG. 18. This will create an area in which operators are free to work in removing bent glass sheets from the moving bending apparatus.

In FIGS. 29 to 34, inclusive, there is shown a modified form of sheet transfer device, generally designated by the numeral 350 and which is adapted to be employed with the sheet handling apparatus of this invention for the same purpose as the transfer device 90 hereinbefore described as being adapted to receive a bent glass sheet 103 from the lifting device 89 and remove the sheet to the conveyor 191. As herein disclosed in the modified form of apparatus, the device 350 includes transfer frames generally designated by the numeral 351, and having sheet gripping devices 352 and 353, that are adapted to receive a glass sheet from the lifting device 89 and while traversing an arcuate path of substantially 180°, transfer the same to a take-off conveyor 354. Generally speaking, the sheet gripping devices 352 and 353 of the transfer frames 351 are oppositely disposed at the respective ends of said frames and operate to receive a sheet 103 from the lifting bars 137 of the lifting device 89 when located in a lowermost position, to be rotated upwardly and to then deposit said sheet on the take-off conveyor 354 upon reaching an uppermost position. Thus, the sheet gripping devices are carried in a circularly directed path of motion; supporting a glass sheet while moving in an upwardly directed path of movement and then sequentially returning to the lowermost position while moving in a downwardly directed continuous circular path of movement. Accordingly, the modified sheet transfer device 350 replaces the transfer frame 90, heretofore described in connection with the handling apparatus of this invention, and will hereinafter be described in the details of its structure and operation; attention being later directed to FIG. 34 wherein an electric system is diagrammatically illustrated for controlled operation of the transfer device in timed relation to the mold opening device 88 and sheet lifting device 89 of said handling apparatus.

For this purpose, the transfer frames 351 of transfer device 350 are generally supported on a shaft 355 in equally spaced relation from the longitudinal axis of the conveyor B. The shaft 355 is journaled at its opposite ends in bearings 356 and 357 mounted on vertically disposed frame structures 358 and 359. As viewed in FIG. 29, the frame structure 358 is supported on the horizontally disposed channels 21 of the frame structure 20 at the left hand side of the roll conveyor B and the structure 359 is similarly mounted on the oppositely disposed channels 21 of the frame structure at the right hand side thereof. For purposes to be hereinafter more fully disclosed, the structure 359 also includes vertically disposed pedestals 360 for the support of a platform 361.

Adjacent the structure 358, the shaft 355 mounts a fixed locking device 363 formed with a hub 364 having oppositely disposed arms 365. The arms 365 are equipped at their outer ends with cam-shaped end plates 366 that are adapted to engage a spring-biased stop roll device 367. The arms 365 are thus supported by hub 364 on the shaft 360 in diametric alignment to one another and the end plates 366 successively engage the roll 367 upon completion of each partial rotation of the transfer device 350 to positively locate the sheet transfer frames 351 disposed in a substantially vertical plane and the pairs of gripping devices located in an uppermost position or in the lowermost position in which a sheet 103 will be received thereby.

Figure 33:
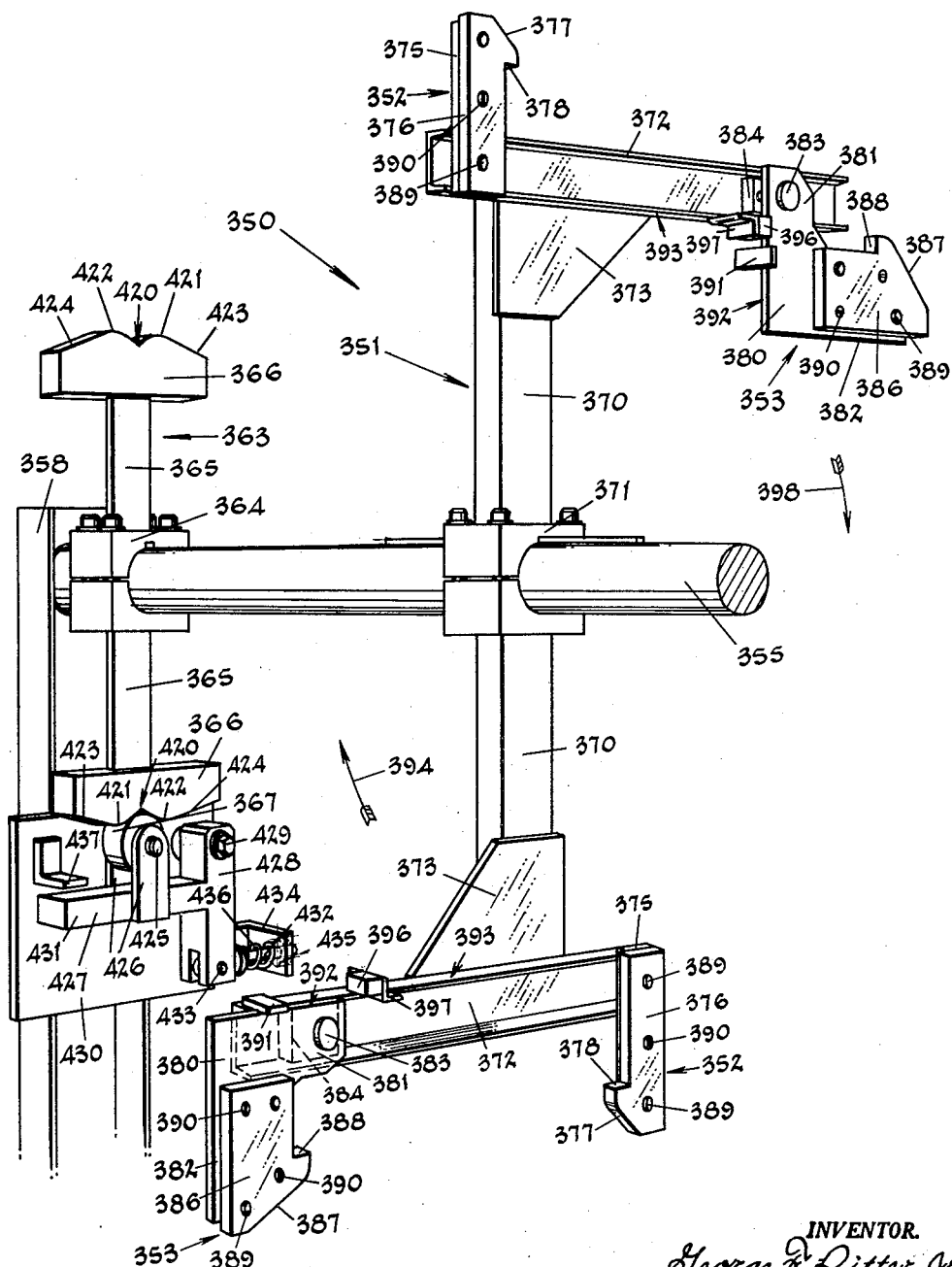
FIG. 33 is an enlarged detail view of the modified form of transfer mechanism.

Referring now particularly to the structure of the sheet transfer frames 351 in FIG. 33, it will be seen that they include oppositely disposed arms 370 secured at one or the inner end to a hub 371 keyed to the shaft 355. The arms 370 are equipped at their outer ends with channel bars 372 that are fixedly secured to said arms 370 at substantially a right angle thereto and reinforced by gusset plates 373. Each channel bar 372 carries at its opposite ends a pair of the sheet gripping devices 352 and 353.

The gripping device 352 consists of a fixed plate 375 arranged at an outwardly directed right angle to the bar 372 and equipped with a block 376 of non-abrasive material, such as compressed fiber or the like. On its inwardly directed edge, the block 376 is formed with an upwardly inclined surface 377 which provides a ledge portion 378 on which one marginal edge portion of a glass sheet will be received. The gripping device 353, on the other hand, is mounted for pivotal movement relative to the associated bar 372 and in an outward direction relative to the oppositely disposed gripping device 352. Generally speaking, when sheet engaging members are in the lowermost position, the gripping device 352 is directed downwardly in sheet receiving position and the device 353 is balanced, by reason of its mounting, to swing downwardly and inwardly toward the opposed device.

For this purpose, the gripping member 353 includes a substantially L-shaped plate 380 having leg portions 381 and 382. The leg 381 at its end is equipped with a fixed stud 383 that is journaled in a bearing block 384 secured to the inner surface of the related channel bar 372. Similarly to the plate 375, the leg 382 of gripping member 353 is equipped with a non-abrasive block 386 which is formed on its inwardly directed edge with an upwardly inclined surface 387 which provides a ledge portion 388 on which the opposite marginal edge portion of a glass sheet will be received. Although not described in detail, it will be understood that the blocks 383 and 393 are secured to their respective plate members for convenience of attachment and/or replacement as by locator plugs 389 and screws 390.

The sheet gripping device 353 is restrained from swinging inwardly by means of a lug 391 that is attached to the upper edge surface 392 of the leg portion 381. The lug 391 engages the adjoining upper surface 393 of the channel bar 372 when the pairs of gripping devices 352 and 353 are located in their lowermost position to receive a sheet of glass. When the sheet transfer frames 351 are turned in an upwardly directed circular path, indicated by the arrow designated by the numeral 394, the sheet 103 will be supported and held between the active pairs of gripping devices 352 and 353 until the associated arms 370 approach a vertical plane. At this time the gripping devices 353 swing forwardly to release the leading edge of the sheet onto the belts 395 of the take-off conveyor 354 as viewed in FIG. 30.

To prevent undue swinging motion of the devices 353, a strike block is positioned on the surface 393 of each channel bar 372 and is provided with a cushioning block 396, of rubber, compressed fiber or the like, carried by an angle support 397 which is secured to the bar. As viewed in FIG. 33, the forward swinging motion of the gripping devices 353 is arrested upon engagement of the edge 392 of the plate 380 with the surface of the block 396.

As the uppermost pairs of gripping devices are subsequently turned in a downwardly directed path, indicated by the arrow designated by the numeral 398, the gripping devices 353 will swing about the axes of the related studs 383 in bearing blocks 384 until the associated lugs 391 engage the surfaces 393 of the channel bars 372.

Outwardly of the bearing 357, the shaft 355 mounts a switch actuator 400 and a sprocket 401 as viewed in FIGS. 29 and 32. The actuator 400 is formed of a hub 402 and outwardly directed arms 403 adapted to engage a switch 404 upon completion of each one-half rotation of the shaft 355. For this purpose, a motor gear-reduction unit 405 is located on the platform 361 and its output shaft is provided with a sprocket 406. Sprocket 406 through chain 407 is adapted to drive a sprocket 408 that is freely rotatable on shaft 409 and is associated with an electro-magnetic clutch 410. The driven portion of this clutch is also provided with a magnetic brake 411. The shaft 409 is journaled in bearings 412 mounted by supports 413 on platform 361 and oppositely to sprocket 408 carries a fixedly secured sprocket 414. Sprocket 414 is operatively associated with sprocket 401, on shaft 355, by chain 415. Accordingly, when the clutch 410 is engaged, the power drive through chains 407 and 415 will rotate the shaft 355 to turn the sheet transfer frames 351 thereby effecting the transfer of a glass sheet 103 from the lower position of the gripping devices 352 and 353 in which they receive the same from the sheet lifting device 89 to the upper position whereat the sheet is deposited on the conveyor 354 and automatically released from said gripping devices. At this time, one of the arms 403 of the actuator 400 will temporarily engage the switch 404 while simultaneously one of the cam plates 366 of the locking device 363 will engage the stop roll 367.

As shown in FIG. 33, the cam-shaped end plates 366 are provided in the central area of their outwardly directed surfaces with a V-shaped notch 420 defined by cam surfaces 421 and 422 which include entry and exit inclined surfaces 423 and 424. Cam surface 422 and inclined surface 424 are higher than the entry cam surfaces 421 and 423 to engage the surface of the roll 367 as it is received in the notch 420. The roll 367 is supported on an axle 425 that is mounted at its ends in plates 426 carried by a lever 427. The lever is substantially T-shaped and is pivotally mounted at one end of the arm portion 428 by a bolt 429 that is secured in a support plate 430 carried by the frame structure 358; the plates 426 being affixed to the leg portion 431. The opposite end of arm portion 428 is bifurcated to receive the head of a bolt 432 which is formed with an "eye" for support pin 433. The opposite end of bolt 432 is slidable with reference to an angle 434 of support plate 430 and outwardly thereof is equipped with an adjusting nut 435. Interposed between the arm 428 and the angle 434 and encircling the bolt 432 is a coil spring 436 which acts to swing the lever 427 and roll 367 upwardly to obtain positive entry of the roll into the notch 420 of either of the end plates 366. During rotation of the shaft 355 and consequent disengagement of said end plates from the roll, further and undesired upward motion of the lever 427 is halted by an angle 437 on plate 430 which engages the outer end of leg portion 431.

As hereinabove set forth, and as a bending apparatus C enters the removal area of the handling device H, the oppositely disposed end frames 50 of said apparatus are simultaneously engaged by the cross-bars 97 of the locking frames 91 and continued forward movement thereof is halted. One of the frames 50, while engaged by a locking frame 91, rests on the two switch control levers 228 and 229. Now, according to the description of the electrical circuitry of FIG. 19, the mold opening device 88 and sheet lifting device 89 are activated. Briefly stated, upon the completion of the circuit of line 274 through electro-magnetic clutch 171, the driven portion 171a thereof will be engaged with the driven portion 171b to operatively rotate shaft 129 on which the cams 120 and 128 are mounted.

As discussed in connection with FIGS. 12, 25, 26, 27 and 28, the lever 118, by roll 119 thereof traversing cam 120, is caused to rock the shafts 106 which through arms 104 and vertically disposed bars 90 raises the horizontally disposed bars or angles 111 into engagement with the rails 115 forming the central mold section 52. As viewed in FIG. 29, this operates to move the mold sections to the open position thereby releasing the bent glass sheet 103.

Figure 30:
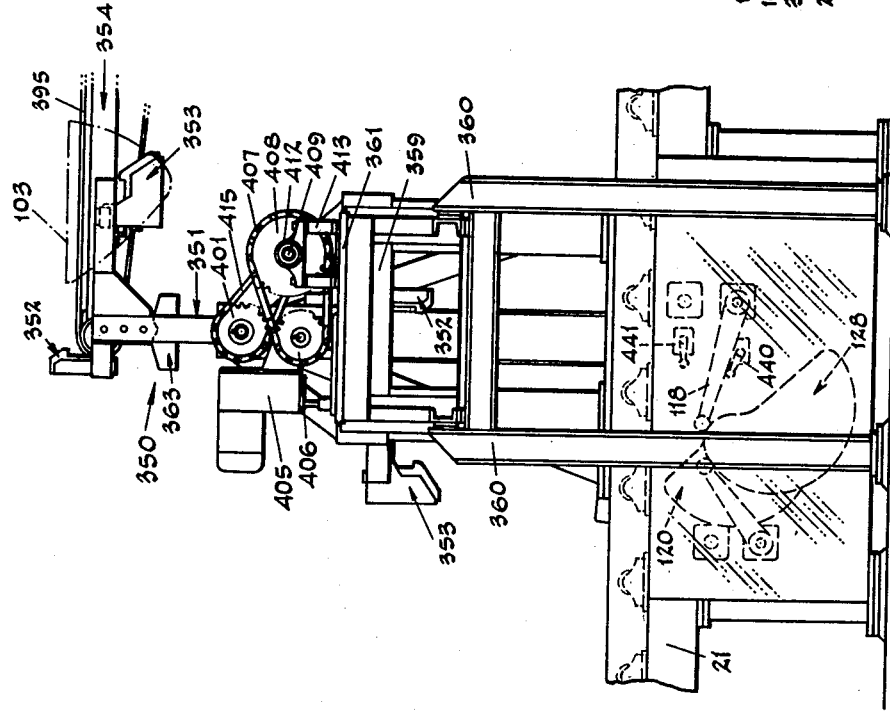
FIG. 30 is an elevational view of the sheet handling device as viewed from the right side of FIG. 29.

As shown in FIGS. 30 and 34, when the lever 118 is in the lower or idle position, it engages and closes a limit switch 440. Also, as viewed in FIGS. 30 and 34, when the lever is swung to the upper limit of its movement, it engages and closes a second limit switch 441. Accordingly, when the lever 118 moves upwardly and the mold opening device 88 is raised to open the mold, the switch 440 is opened and the switch 441 is closed and reopened as the lever reaches and departs for the said upper limit. The switch 441 is thus adapted to establish an electric circuit which is completed upon reclosure of the switch 440 when the lever returns to the lower limit of its movement.

In timed relation to the opening of the mold by the opening device 88, the cam 128 actuates the associated lever 126 whereupon the shaft 122 will rock the arms 121 upwardly to raise the related glass lifting members 137 of the lifting device 89. As aforementioned, the lifting members 137 remove the bent glass sheet 103 from the mold surface and lift it toward the transferring member. In accordance with the modified form of the invention and with particular reference to FIGS. 29 to 34 inclusive, the sheet is lifted to a height at which it will be received on the ledges 378 and 388 of the gripping devices 352 and 353 respectively. This is achieved as the opposed marginal edges of the sheet are carried along the inclined surfaces 377 and 387 and force the pivotally mounted devices 353 to swing outwardly sufficiently for the sheet to move therepast. The devices than swing, by reason of their balanced mounting, to receive the related edge of the sheet on the ledges 388 thereof as the opposed edge is received on the ledges 378 of the devices 352.

Thus, continued rotation of the cams 120 and 128 lowers the sheet lifting device 89 and the mold opening device 88 in sequence, the locking frames 91 are lowered and the bending apparatus is released for continued movement along conveyor B. The supported glass sheet is then transferred to the take-off conveyor 354.

For this purpose, referring to FIG. 34, there is provided a relay switch 445 having opposed solenoids 446 and 447 with normally open contacts 448 engageable by armature 449. Likewise relay switch 455 has opposed solenoids 456 and 457, normally open contacts 458, normally closed contacts 459 and armature 460. Now, when switch 441 is closed by engagement of the lever 118, as in the broken line position in FIG. 34, it completes a circuit from a source line 465, through line 466 to solenoid 446 of relay switch 445 and thence by line 467 to an opposite source 468. Armature 449 thereby engages contacts 448 to establish a circuit from source line 465 to line 469 and one side of limit switch 440. However, since switch 440 remains open in the broken line position of FIG. 34 while the lever 118 is removed from engagement therewith, the line 469 is incomplete. Accordingly, when the mold opening device 88 has been lowered and the lever 118 reaches the lower limit of its movement, line 469 is completed to solenoid 456 of relay switch 455 and thence by line 470 to opposite source 468. This activates armature 460 to disengage contacts 459 thereby opening a circuit from source 465 and line 471 to magnetic brake 411 to de-energize the same. Simultaneously, contacts 458 are engaged to complete a circuit from source 465 via line 472 to the electro-magnetic clutch 410 and thence by line 473 to opposite source 468. Engagement of the clutch enables sprocket 408 to drive shaft 409 thereby driving sprocket 414 and, through chain 415, the sprocket 401 on shaft 355.

The sheet transfer frames 351 are thus turned to carry the sheet 103, supported by pairs of gripping devices 352 and 353, upwardly toward the take-off conveyor 354. As aforementioned, as the arms 370 approach a vertical plane, the gripping devices 353 are swung forwardly to release the leading edge of the sheet onto the conveyor which then removes the same, as viewed in FIG. 30. Also, as the arms 370 approach the vertical plane, one cam-shaped end plate 366 engages the stop roll 367 along the inclined surface 423 and depresses the roll along the cam surface 421 until the spring 436 urges the lever 427 upwardly as the roll 367 enters the notch 420. At the same time, an arm 403 of actuator 400 engages the limit switch 404 to close the same as it is moved temporarily from the full line position to the broken line position (FIG. 34) and then releases the switch to reopen the same. However, while switch 404 is closed, a circuit is completed from source 465 by line 475 to solenoid 447 of relay switch 445 and by line 476 to opposite source 468 thereby opening the circuit of lines 465—469 at contacts 448. Simultaneously, line 475 completes a circuit to solenoid 457 of relay switch 455 and thence by line 477 to opposite source 468. This actuates armature 460 to disengage contacts 458 to open the circuit of lines 465—472 thereby de-energizing the electro-magnetic clutch 410. Upon engagement of contacts 459, a circuit is re-established between lines 465 and 471 to the brake 411 and thence by line 478 to opposite source 468 whereupon rotation of the shaft 409 will be halted. Accordingly, operation of the modified form of sheet transfer device 350 is initiated upon closure of limit switch 440 when the mold opening device 88 has returned to its lowermost position and is terminated by temporary actuation of the limit switch 404. The device 350 is thus activated to transfer a glass sheet to the take-off conveyor 354, during rotative movement of 180°, to locate the alternative pairs of gripping devices 352 and 353 for reception of a subsequent sheet therebetween and is halted by the locking device 363 with the arms 370 of the sheet transfer frames 351 in a vertical plane.

It is to be understood that the forms of the invention herewith shown and described are to be taken as illustrative embodiments only of the same, and that various changes in the shape, size and arrangement of parts may be resorted to without departing from the spirit of the invention.

I claim:

1. A glass transfer device for removing bent glass sheets from a bending mold moving along a first conveyor and depositing said sheets upon a second conveyor wherein said bending mold includes movable mold sections in the closed position and said first conveyor has an open area formed therein which device includes the combination of means located in the path of movement of said mold moving along the first conveyor to stop the mold above the open area, means for moving the movable mold sections from their closed position to another position so that a glass sheet resting on said sections may be lifted off said sections, means for removing a bent glass sheet from said mold and depositing said sheet upon the second conveyor, bending mold aligning means located in the path of the mold and in advance of said sheet removing means to align the bending mold as it moves along the first conveyor and towards the open area formed therein with said glass removing means and means for actuating the said bent glass sheet removing means only after the said mold stopping means has arrested the movement of the mold along the path of the first conveyor and held said mold at rest in a position above the open area of the first conveyor.

2. A glass transfer device as claimed in claim 1, wherein said bent glass sheet removing means includes sheet lifting means operable in a vertical direction and upwardly through the open area to remove a bent glass sheet from the mold while the mold is at rest and bent glass sheet transfer means operable to lift a glass sheet off of said sheet lifting means and depositing said sheet onto the second conveyor.

3. A glass transfer apparatus for removing glass sheets from a bending mold having movable mold sections, said transfer apparatus being operable after the glass sheets and bending mold have passed through a glass bending furnace in which the glass sheets are bent when the movable mold sections shift from their open to their closed position, including the combination of a first conveyor for moving the bending molds and bent glass sheets along a continuous path, said conveyor having a centrally disposed substantially rectangular open area formed therein, the width of said area being less than the width of said bending molds both dimensions being measured transverse to the direction of movement of said molds, bending mold aligning means located along the first conveyor path and in advance of the conveyor open area to shift the molds individually transversely of said first conveyor to maintain the plurality of molds in longitudinal alignment with the said open area in said first conveyor, mold stop means located along the first conveyor path to arrest the forward movement of a bending mold when said mold is above said open area, mold opening means located along the first conveyor path moving the movable mold sections from their closed position to a position in which a bent glass sheet resting on said mold sections can be freely lifted therefrom, sheet lifting means to raise the bent glass sheet upwardly above said bending mold, a second conveyor to carry away the bent glass sheet removed from said bending molds, glass transfer means to receive a bent glass sheet from said sheet lifting means and to transport said bent glass sheet onto said second conveyor, and control means to time the sequential operation of said first conveyor, said bending mold stop means, said mold opening means, said sheet lifting means, and said glass transfer means with respect to each other.

4. In a handling device for bent sheet articles, means for supporting a bent sheet article including bending mold sections adapted to move from a closed mold position to an open mold position, conveying means for carrying the support means forwardly along a horizontally disposed path of movement including a plurality of regularly spaced conveyor rolls, a frame structure on which the plurality of conveyor rolls are rotatably mounted, a source of power, magnetic clutch means operatively connecting the source of power to the conveyor rolls to drive the same, control means for selectively engaging and disengaging the magnetic clutch means, certain of the rolls being shorter in length than the remainder of said rolls and arranged in transversely aligned relation adjacent the frame structure to define an open area between the next adjoining longer conveyor rolls, means for initially aligning the support means as it is carried forwardly toward and in relation to said oppositely disposed short conveyor rolls, stop means located above each of said short conveyor rolls in the path of movement of said support means to halt the same upon engagement therewith, means engageable with the mold sections of the support means to move the same to open mold position, lifting means engageable with the bent sheet article on the then opened mold sections to remove said article therefrom, transferring means receiving bent sheet article from the said lifting means to transfer the said article therefrom, a second conveyor means adjacent said transferring means to receive the said article therefrom, means actuating the said control means to disengage the magnetic clutch means to halt rotation of the said plurality of conveyor rolls when the support means is engaged with said stop means, and means actuated by said support means when rotation of the conveyor rolls has been halted to automatically activate the opening means, the lifting means and the transferring means in sequence to remove a bent sheet article from the mold sections of the said support means.

5. In a handling device as claimed in claim 4, wherein the power controlling means includes a switch actuating member adapted to be engaged by the support means when stopped on said pairs of short rolls and thereby causing rotation of the plurality of rolls to be halted, said switch member including means for then producing automatic sequential operation of the support opening means, bent sheet article lifting means and the said transfer means.

6. In a handling device as claimed in claim 4, in which the supporting means includes a bending mold and a rack therefor, the bending mold having hingedly associated sections pivotally carried by the rack, and the opening means includes a pair of mold engaging devices whereby the hingedly associated sections of the bending mold will be swung upwardly from a closed position to an open mold position with respect to the mold rack before removal of a bent sheet article from the bending mold by the lifting means, and means moving the mold engaging means in a substantially vertically directed path of motion.

7. In a handling device as claimed in claim 6, in which means is included for sequentially and cyclically raising and lowering the pair of mold opening devices and means is further included for sequentially and cyclically raising and lowering the bent sheet article lifting means, said lifting means being raised after the mold opening devices have been raised and then lowered before the said mold opening devices are lowered to return the bending mold to a closed position.

8. In a handling device for bent sheets of glass, plastic or like materials, the combination with a bent sheet supporting means comprising a rack and a bending mold, the mold having hingedly associated sections adapted in an open position to support a flat sheet and a subsequently bent sheet in the closed position thereof, of a conveyor means for carrying the support means along a substantially straight horizontally disposed path of movement including a plurality of regularly spaced conveyor rolls, a source of power for driving the rolls, certain of the rolls being shorter in length than the remainder of the conveyor rolls and arranged in transversely aligned relation adjacent the frame structure to define an open area between the next adjoining longer rolls, means disposed in advance of the oppositely disposed shorter rolls to align a forwardly moving support means with respect thereto, said means being comprised of freely movable surfaces arranged transversely across the plurality of conveyor rolls to engage the rack of said support means and shift the same transversely with respect to said conveyor rolls to a substantially centralized path of forward movement with respect to the oppositely disposed shorter conveyor rolls, vertically movable locking means adjacent each of the shorter conveyor rolls and engageable by the rack of said support means when said locking means is at an upper limit of movement, hydraulic means for moving the vertically movable locking means, means controlling the source of power to halt rotation of the plurality of conveyor rolls when the said rack is engaged with the vertically movable locking means and subsequently to start rotation of said conveyor rolls after said rack is released therefrom, means operable between the oppositely disposed shorter conveyor rolls for removing a bent glass sheet from the bending mold of the support means when the rack thereof is engaged by the vertically movable locking means, and means automatically actuating the hydraulic means to lower said vertically movable locking means to disengage said rack of the supporting means when the said sheet has been removed from the bending mold thereof.

9. In a handling device as claimed in claim 8, in which the vertically movable locking means comprises stop members arranged above each of the opposed pairs of short conveyor rolls, means for pivotally mounting one end of each stop member on the said frame structure, fluid operated means associated with the opposite end of each stop member to raise and lower the same, and means is included for automatically actuating the fluid operated means to raise the stop members into upper positions to stop the rack of a support means when conveyed thereagainst and to lower said stop members to release the engaged rack of a support means subsequently to the removal of a bent glass sheet from the bending mold thereof.

10. In a handling device as claimed in claim 8, in which the bent sheet removing means includes an opening device for the hingedly associated sections of the bending mold, a lifting device for lifting a bent sheet from the hingedly associated sections when opened and a transfer frame for receiving the lifted bent sheet from said lifting device, and means is included for automatically controlling sequential operations of the opening device, the lifting device and the transfer frame.

11. In a handling device as claimed in claim 10, in which is included a shaft rotatably mounted on the said frame structure, means operably driving the shaft, a cam plate fixedly mounted on the shaft, means associated with the said opening device and actuated by the cam plate, a second cam plate fixedly mounted on said shaft, means associated with the said lifting device and actuated by the second cam plate, means operatively connected to the transfer frame and rotatable in timed relation to said cam plates, and means for automatically controlling the said shaft driving means to execute one cycle of the bent sheet removing operation.

12. In a handling device as claimed in claim 11, in which the opening device for the bending mold includes a pair of transversely disposed shafts, means journaling the opposed ends of the pair of shafts one above the other on the said frame structure, a pair of arms fixedly mounted on each of the pair of shafts, a vertically disposed bar pivotally carried by each of the pairs of arms for upwardly and downwardly directed movements between the opposed pairs of short conveyor rolls, a lever carried on one of said pair of shafts and having a roller adapted to engage the first-named cam plate in rolling contact therewith, said cam plate having generated surfaces for pivotally swinging the lever to radially move the pair of shafts and arms thereon to support the said bars in an uppermost position for the majority of the cyclic rotation of the first-named cam plate and then to lower the said bars, and means carried by each of the bars adapted during the upwardly direction movement thereof to engage the hingedly associated sections of the bending mold and move the same from a closed position to an open position.

13. In a handling device as claimed in claim 11, in which the sheet lifting device includes a pair of transversely disposed shafts, means journaling the opposed ends of the pair of shafts one above the other on the said frame structure, a pair of arms fixedly mounted on each of the pair of shafts, a vertically disposed bar pivotally carried by each of the pairs of arms for upwardly and downwardly directed movements between the opposed pairs of short conveyor rolls, a horizontally disposed bar having sheet supporting members affixed to the upper end of each of the said bars, a lever carried on one of said pair of shafts and having a roller adapted to engage the second-named cam plate in rolling contact therewith, the second cam plate having generated surfaces adapted to pivotally swing the lever to radially move the pairs of shafts and arms thereon upwardly and then downwardly to raise the associated horizontally disposed bars into lifting engagement with a bent glass sheet and then to lower the said arms and bars, the generated peripheral surface of the first-named cam plate being correlated to the generated peripheral surface of the second-named cam plate to effect maintenance of the opening device in its uppermost position during the raising and lowering of the sheet lifting device.

14. In a handling device as claimed in claim 11, in which the transfer frame comprises a pair of elongated oppositely disposed side rails arranged parallel to the longitudinal axis of the said frame structure and a pair of transversely disposed rails affixed at their opposite ends to the side rails, means carried by each of the pair of transversely disposed rails for flexibly gripping the opposite marginal edges of a bent glass sheet, a transversely disposed shaft rotatably supporting said transfer frame, opposite vertically disposed columns mounted on the frame structure for rotatably supporting the shaft, a sprocket carried at one end of the shaft, a bar secured to the second-named cam plate in predetermined angular relation to the generated peripheral surface thereof, a sprocket chain trained about the sprocket and attached at one end to the bar, tensioning means attached to the frame structure and connected to the opposite end of the chain, a second conveying means, said tensioning means being operable to impose a pulling force on said chain during rotation of the bar with the second-named cam plate during the initial portion of rotation thereof through a rotary operative cycle whereby the transfer frame will be swung to a position in the upwardly directed path of the sheet lifting device to receive a bent glass sheet therefrom and to carry said sheet to the second conveying means during a subsequent portion of rotation of said second-named cam plate through the rotary operative cycle.

15. In a handling device as claimed in claim 14, in which the flexibly gripping means comprises a pair of base members on each of the transversely disposed rails, a base member of each pair on one rail being aligned with a base member of the pair on the other rail and in parallel with the longitudinal axis of the frame structure, means mounting each of the pairs of base members for adjustment along the respective transverse rail, a vertically disposed plate fixedly carried by each of the base members, a lever pivoted on each of the plates, means biasing each of the levers toward an aligned oppositely disposed lever, a notched block of non-abrasive material mounted on the oppositely disposed end of each lever, a frame mounted on the frame structure for supporting the second-named conveying means in upwardly spaced relation to the first-named conveying means, and means mounted on the last-mentioned frame engageable with certain of the said levers to swing the same against the biasing means and release the related marginal edge of the bent glass sheet onto the second-named conveying means during rotation of the bar and second-named cam plate through the said subsequent portion of their rotary operative cycle.

16. A device as defined in claim 2, in which said bent glass transfer means comprises a shaft rotatably mounted above said sheet lifting means, arms radially extending from said shaft, a bar carried by each of said arms, means carried by each of said bars for flexibly gripping opposite marginal edges of a bent glass sheet, and means for driving said shaft to successively bring said bars into position to engage said marginal edges with said flexible gripping means.

17. A device as defined in claim 16, in which said flexible gripping means comprises a fixed notched plate at one end of each bar and a pivotally mounted notched plate at the opposite end of each bar.

18. In a handling device as claimed in claim 16, in which said first conveyor includes a frame structure, a second shaft rotatably mounted on said frame structure, means operably driving said second shaft, a cam plate fixedly mounted on the second shaft, means associated with the mold opening means and actuated by the cam plate, a second cam plate fixedly mounted on said second shaft, means associated with said sheet lifting means and actuated by the second cam plate, means for automatically controlling the driving means for said second shaft to execute one cycle of the bent sheet removing operation, an electric circuit controlling said first-mentioned shaft driving means, a switch in said electric circuit for initiating operation of the sheet transfer device, means associated with said first cam plate for effecting closure of the switch upon the termination of one cycle of the sheet removing operation, and a second switch means in said electric circuit for automatically controlling the said drive means to execute one cycle of the sheet transfer operation.

19. In a handling device as claimed in claim 18, in which is included clutch means operatively connecting the driving means to the first-mentioned shaft, said first switch means in said electric circuit being actuated by said mold opening device to engage said clutch means, means carried by said first-mentioned shaft to operate the second switch means to disengage said clutch, locking means mounted on said frame structure, and means carried by the first-mentioned shaft adapted to engage the locking means and halt rotation of the said first-mentioned shaft after one-half of a full rotation thereof and with the said arms located in a substantially vertical plane.

20. In a handling device as claimed in claim 19, in which the locking means includes a spring-biased roll, a pair of arms mounted radially on said first-mentioned shaft in diametric relation therewith, and cam shaped members carried by each of the arms and engageable with said spring-biased roll.

References Cited in the file of this patent

UNITED STATES PATENTS

| | | |
|---|---|---|
| 1,898,037 | Dietz | Feb. 21, 1933 |
| 2,137,115 | Marshall | Nov. 15, 1938 |
| 2,818,156 | Edwards | Dec. 31, 1957 |

FOREIGN PATENTS

| | | |
|---|---|---|
| 756,289 | Great Britain | Sept. 5, 1956 |